(12) United States Patent
Yahata

(10) Patent No.: US 11,943,543 B2
(45) Date of Patent: Mar. 26, 2024

(54) IMAGING DEVICE

(71) Applicant: SK hynix Inc., Icheon-si (KR)

(72) Inventor: Kazuhiro Yahata, Tokyo (JP)

(73) Assignee: SK HYNIX INC., Icheon-si (KR)

(*) Notice: Subject to any disclaimer, the term of this patent is extended or adjusted under 35 U.S.C. 154(b) by 0 days.

(21) Appl. No.: 17/839,807

(22) Filed: Jun. 14, 2022

(65) Prior Publication Data

US 2023/0021729 A1    Jan. 26, 2023

(30) Foreign Application Priority Data

Jul. 22, 2021 (KR) ......................... 10-2021-0096596

(51) Int. Cl.
*H04N 23/741* (2023.01)

(52) U.S. Cl.
CPC ................. *H04N 23/741* (2023.01)

(58) Field of Classification Search
CPC ...... H04N 23/741; H04N 23/76; H04N 23/73; H04N 23/71; H04N 23/75; H04N 25/58; H04N 25/59
See application file for complete search history.

(56) References Cited

U.S. PATENT DOCUMENTS

| | | | |
|---|---|---|---|
| 9,172,889 B2 | 10/2015 | Li et al. | |
| 9,843,746 B2 | 12/2017 | Koshkin et al. | |
| 2006/0170812 A1* | 8/2006 | Kobayashi | G03B 13/36 348/E5.035 |
| 2015/0042848 A1* | 2/2015 | Furukawa | H04N 9/68 348/242 |
| 2015/0042872 A1* | 2/2015 | Suzuki | H04N 23/84 348/370 |
| 2016/0050359 A1* | 2/2016 | Nakata | H01L 27/14623 250/201.2 |
| 2017/0201693 A1* | 7/2017 | Sugizaki | H04N 23/71 |
| 2017/0353678 A1* | 12/2017 | Ogushi | H04N 23/672 |
| 2021/0360139 A1* | 11/2021 | Mcelvain | H04N 23/741 |
| 2022/0394203 A1* | 12/2022 | Matsuura | H04N 25/616 |
| 2023/0014397 A1* | 1/2023 | Yamasaki | H04N 25/535 |

* cited by examiner

*Primary Examiner* — Michael Lee
(74) *Attorney, Agent, or Firm* — Perkins Coie LLP

(57) ABSTRACT

An imaging device may include an image sensing device including a plurality of pixels to detect incident light from a scene to generate a pixel signal corresponding to the incident light and generate image data, wherein the image sensing device operates to perform imaging operation in response to a control signal, a luminance acquisition unit to acquire the image data corresponding to first pixels among the plurality of pixels associated with a target region of an image of the scene captured by the image sensing device, a controllable item acquisition unit to acquire one or more sensitivity items indicative of sensitivity of each pixel to light, as a controllable item, and a set value calculation unit to generate the control signal to the imagine sensing device by calculating a set value for the controllable item based on the image data of the target region and the controllable item.

17 Claims, 10 Drawing Sheets

IMAGING DEVICE

CROSS-REFERENCE TO RELATED APPLICATION

This patent document claims the priority and benefits of Korean patent application No. 10-2021-0096596, filed on Jul. 22, 2021, the disclosure of which is incorporated herein by reference in its entirety as part of the disclosure of this patent document.

TECHNICAL FIELD

The technology and implementations disclosed in this patent document generally relate to an image sensing device for generating a high dynamic range (HDR) image.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various fields such as smart phones, digital cameras, game machines, IoT (Internet of Things), robots, security cameras and medical micro cameras.

The image sensing device may be roughly divided into CCD (Charge Coupled Device) image sensing devices and CMOS (Complementary Metal Oxide Semiconductor) image sensing devices. The CCD image sensing devices offer a better image quality, but they tend to consume more power and are larger as compared to the CMOS image sensing devices. The CMOS image sensing devices are smaller in size and consume less power than the CCD image sensing devices. Furthermore, CMOS sensors are fabricated using the CMOS fabrication technology, and thus photosensitive elements and other signal processing circuitry can be integrated into a single chip, enabling the production of miniaturized image sensing devices at a lower cost. For these reasons, CMOS image sensing devices are being developed for many applications including mobile devices.

SUMMARY

Various embodiments of the disclosed technology relate to an imaging device for generating a high dynamic range (HDR) image using an optimal method.

In an embodiment of the disclosed technology, an imaging device may include an image sensing device including a plurality of pixels, each of which is structured to detect incident light from a scene to generate a pixel signal corresponding to an intensity of the incident light and generate image data corresponding to the pixel signal, wherein the image sensing device operates to perform imaging operation in response to a control signal, a luminance acquisition unit configured to acquire the image data corresponding to first pixels among the plurality of pixels associated with a target region of an image of the scene captured by the image sensing device, a controllable item acquisition unit configured to acquire one or more sensitivity items indicative of sensitivity of each pixel to light, as a controllable item, and a set value calculation unit configured to generate the control signal to the imagine sensing device by calculating a set value for the controllable item based on the image data of the target region and the controllable item.

In another embodiment of the disclosed technology, an imaging device may include an image sensing device including a plurality of pixels structured to detect incident light to generate a pixel signal corresponding to an intensity of the incident light and generate image data corresponding to the pixel signal, a high dynamic range (HDR) controller configured to generate a control signal by calculating a set value for at least one of an amount of light exposure, an exposure time, a conversion gain, and an analog gain, as a controllable item, based on the image data, and an image signal processor coupled to receive the control signal from the high dynamic range (HDR) controller and configured to synthesize image data having different sensitivities generated by adjusting the sensitivity of each of the plurality of pixels in response to the received control signal and generate a high dynamic range (HDR) image based on the image data.

In another embodiment of the disclosed technology, a photographing device may include an image sensing device including a plurality of pixels, each of which generates a pixel signal corresponding to the intensity of incident light and generating image data corresponding to the pixel signal, a luminance acquisition unit configured to acquire the image data of a target region corresponding to target pixels from among the plurality of pixels, a controllable item acquisition unit configured to acquire at least one controllable item from among sensitivity items for determining sensitivity of each of the pixels, and a set value calculation unit configured to calculate a set value for the at least one controllable item based on the image data of the target region and the at least one controllable item, and thus generate a control signal using the calculated set value.

In another embodiment of the disclosed technology, a photographing device may include an image sensing device including a plurality of pixels, each of which generates a pixel signal corresponding to the intensity of incident light and generates image data corresponding to the pixel signal, a high dynamic range (HDR) controller configured to calculate a set value for at least one controllable item from among the amount of light exposure, an exposure time, a conversion gain, and an analog gain based on the image data, thereby generating a control signal, and an image signal processor configured to synthesize image data having different sensitivities generated in a state where the sensitivity of each of the plurality of pixels is adjusted in response to the control signal, thereby generating a high dynamic range (HDR) image.

It is to be understood that both the foregoing general description and the following detailed description of the disclosed technology are illustrative and explanatory and are intended to provide further explanation of the disclosure as claimed.

DETAILED DESCRIPTION

Figure 1:
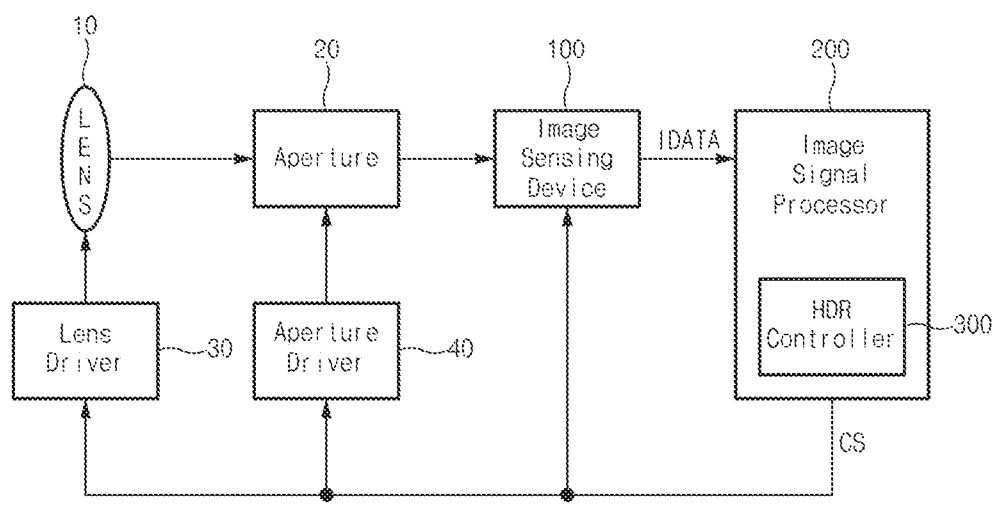
FIG. 1 is a block diagram illustrating an example of a photographing device based on some implementations of the disclosed technology.

This patent document provides implementations and examples of a photographing or imaging device for generating a high dynamic range (HDR) image that may be used to substantially address one or more technical or engineering issues and to mitigate limitations or disadvantages encountered in some other imaging devices. Some implementations of the disclosed technology relate to the photographing or imaging device for generating a high dynamic range (HDR) image using an optimal method that is selected from among various methods. In the context of this patent document, the word optimal that is used in conjunction with the method for generating HDR images is used to indicate methods that provide a better performance for the imaging device. In this sense, the words optimal may or may not convey the best possible performance achievable by the imaging device. The disclosed technology can be implemented in some embodiments to determine a luminance and controllable items associated with a target object to be captured and control the controllable items by reflecting hardware characteristics (e.g., response characteristics) into a process of controlling the sensitivity of the imaging device, thereby generating a high dynamic range (HDR) image having a maximum dynamic range while minimizing noise.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Figure 2:
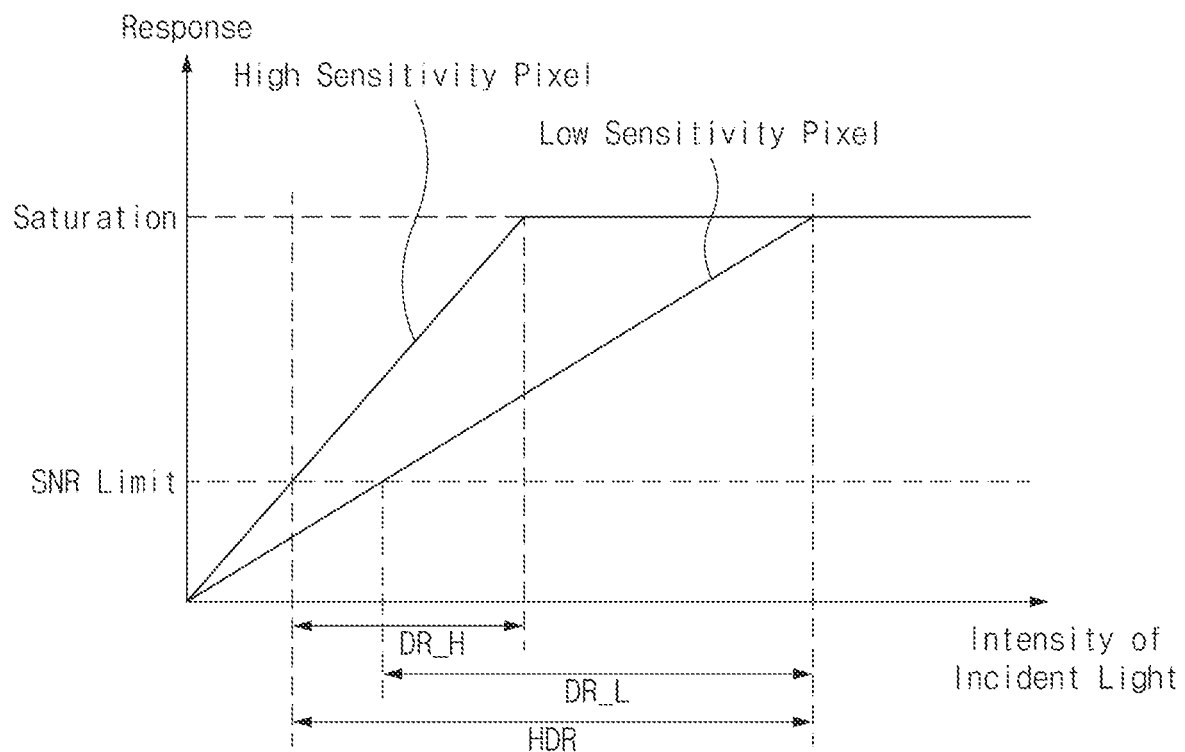
FIG. 2 is a graph illustrating examples of responses that vary depending on luminance of a high-sensitivity pixel and a low-sensitivity pixel implemented based on some implementations of the disclosed technology.

FIG. 1 is a block diagram illustrating an example of a photographing or imaging device 1 based on some implementations of the disclosed technology. FIG. 2 is a graph illustrating examples of responses that vary depending on luminance of a high-sensitivity pixel and a low-sensitivity pixel implemented based on some implementations of the disclosed technology. In some implementations, the word "sensitivity" can be used to indicate the image sensor sensitivity to light. Therefore, the high-sensitivity pixel is more sensitive to light than the low-sensitivity pixel.

Referring to FIG. 1, the imaging device 1 may include any mechanical or electronic devices that can take still or motion pictures such as a digital still camera for photographing still images or a digital video camera for photographing motion pictures. Examples of the imaging device may include a digital single lens reflex (DSLR) camera, a mirrorless camera, or a smartphone, and others. The imaging device 1 may include a lens and an image pickup element to capture (or photograph) light of a target object and create an image of the target object.

The imaging device 1 may include a lens 10, an aperture 20, a lens driver 30, an aperture driver 40, an image sensing device 100, and an image signal processor 200.

The lens 10 may include an optical lens or assembly of lenses aligned with respect to an optical axis. The lens 10 may be disposed in front of the image sensing device 100 so that light rays can be focused to a point on the image sensing device 100. The location of the lens 10 can be adjusted by the lens driver 30. For example, the lens 10 may move along the optical axis by the lens driver 30.

The aperture 20 may be disposed in front of the image sensing device 100. The aperture driver 40 may control the amount of light that reaches the image sensing device 100 by adjusting and the degree of opening or closing of the aperture 20. FIG. 1 illustrates the aperture 20 as being disposed between the lens 10 and the image sensing device 100 to receive light rays having penetrated the lens 10 by way of example only. In other implementations, the aperture 20 may be disposed between lenses included in the lens 10, or may be disposed at the front end of the lens 10.

The light rays having penetrated the lens 10 and the aperture 20 reach the light reception surface of the image sensing device 100, forming an image of a target object to be captured on the image sensing device 100.

The lens driver 30 may adjust the position of the lens 10 in response to a control signal (CS) received from the image signal processor 200. The lens driver 30 may perform various operations such as autofocusing, zooming in and out, focusing by adjusting the position of the lens 10.

The aperture driver 40 may adjust the degree of exposure to light by controlling the opening/closing of the aperture 20 in response to the control signal (CS) received from the image signal processor 200. In this way, the aperture driver 40 may adjust the amount of light rays that reach the image sensing device 100.

The image sensing device 100 may be a Complementary Metal Oxide Semiconductor Image Sensor (CIS) for converting incident light into electrical signals. The image sensing device 100 may adjust an exposure time, a conversion gain, an analog gain, and others by the image signal processor 200. The image sensing device 100 may convert incident light into electrical signals on a pixel basis, thereby generating image data (IDATA). The image sensing device 100 may include a plurality of pixels having different sensitivities to light. In some implementations, the sensitivity may refer to an increase (or an increase in response) in the values of image data (IDATA) in response to an increase in the intensity of incident light. That is, as the sensitivity increases, the amount of increase in the values of the image data (IDATA) corresponding to the intensity of incident light also increases. As the sensitivity decreases, the amount of increase in the values of the image data (IDATA) corresponding to the intensity of incident light also decreases. The sensitivity may be determined based on light transmittance, a conversion gain, an exposure time, an analog gain, etc. A detailed structure and operations of the image sensing device 100 will be described later with reference to FIG. 3.

The image signal processor 200 may process image data (IDATA) received from the image sensing device 100, and may control the constituent elements of the imaging device 1 according to the result of processing the image data or an external input signal. The image signal processor 200 may reduce noise in the image data (IDATA), and may perform various kinds of image signal processing (e.g., gamma correction, color filter array interpolation, color matrix, color correction, color enhancement, etc.) for image-quality improvement in the image data (IDATA). In addition, the image signal processor 200 may compress image data (IDATA) that has been created by the image signal processing and create an image file using the compressed image data. Alternatively, the image signal processor 200 may restore the image data (IDATA) from the image file. In this case, the format for compressing such image data (IDATA) may be a reversible format or an irreversible format. The examples of such compression formats include Joint Photographic Experts Group (JPEG) format and JPEG 2000 format for a still image. Motion pictures can be compressed by compressing a plurality of frames according to Moving Picture Experts Group (MPEG) standards. For example, the image files may be created according to Exchangeable image file format (Exif) standards.

In addition, the image signal processor 200 may generate an HDR image by synthesizing at least two images that are generated using image sensing pixels having different sensitivities. A configuration for generating the HDR image may be defined as an image synthesis unit that is distinct from the HDR controller 300. For example, the image sensing device 100 may output a low-sensitivity image generated by a low-sensitivity pixel with a relatively low sensitivity to light and a high-sensitivity image generated by a high-sensitivity pixel with a relatively high sensitivity to light. The image signal processor 200 may combine the low-sensitivity image and the high-sensitivity image to generate an HDR image. Although the example discussed above uses the low-sensitivity image and the high-sensitivity image to generate the HDR image, the disclosed technology can be implemented in some embodiments to use N images having N different sensitivities, where N is an integer greater than or equal to 2. In one example, the image sensing processor 200 may generate the HDR image using image data (IDATA) with N different sensitivities.

The HDR image generated by the image signal processor 200 may be stored in an internal memory of the imaging device 1 or an external memory in response to a user request or in an autonomous manner to display the stored HDR image on a display device.

In addition, the image signal processor 200 may perform unclearness removal processing, blur removal processing, edge emphasis processing, image analysis processing, image recognition processing, image effect processing, or others.

In addition, the image signal processor 200 may perform display image signal processing for the display. For example, the image signal processor 200 may perform luminance level adjustment, color correction, contrast adjustment, outline emphasis adjustment, screen division processing, character image generation, and image synthesis processing, or others.

The image signal processor 200 may control the lens driver 30, the aperture driver 40, and the image sensing device 100 according to (1) control information automatically generated by image data (IDATA) that is input in real time, or (2) control information that is manually input by a user.

In some implementations particular, the image signal processor 200 may include an HDR controller 300. In other implementations, the HDR controller 300 may also be implemented independently of the image signal processor 200. For example, the HDR controller 300 may be included in the image sensing device 100.

The HDR controller 300 may control at least one of the aperture driver 40 and the image sensing device 100 so that pixels of the image sensing device 100 may have an optimal dynamic range.

FIG. 2 shows responses as a function of the intensity of light that is incident upon the high-sensitivity pixel and the low-sensitivity pixel. The high-sensitivity pixel exhibits a relatively large amount of increase in its response as the intensity of incident light increases, and the low-sensitivity pixel exhibits a relatively small amount of increase in its response as the intensity of incident light increases. The response of the high-sensitivity pixel and the response of the low-sensitivity pixel vary depending on the luminance or the intensity of incident light applied to the corresponding pixel. Here, the response may refer to image data (IDATA) or values of the image data (IDATA) of the corresponding pixel.

The response may have a signal-to-noise ratio (SNR) limit (denoted by SNR limit) and a saturation level (denoted by Saturation).

In FIG. 2, the signal-to-noise ratio (SNR) threshold level refers to a threshold value that can satisfy a reference SNR that is predetermined. A response less than the SNR threshold level may be treated as an invalid response not satisfying the reference SNR, and a response greater than the SNR threshold level may be treated as a valid response satisfying the reference SNR. The reference SNR may be determined experimentally in consideration of characteristics of the image sensing device 100.

A saturation level refers to a maximum level that indicates the intensity of incident light. The saturation level may be determined based on: the capability of the pixel (e.g., capacitance of a photoelectric conversion element) for converting the intensity of incident light into photocharges; the capability (e.g., capacitance of a floating diffusion (FD) region) for converting photocharges into analog signals; and the capability (e.g., an input range of the ADC) for converting analog signals into digital signals. As the intensity of incident light increases, the response may increase in proportion to the intensity of incident light until the response reaches the saturation level. After the response reaches the saturation level, the response may not increase although the intensity of incident light increases. For example, after the response reaches the saturation level, the response remains at the same value as the saturation value and does not increase above the saturation level.

The valid response of each pixel may refer to a response that can indicate the intensity of incident light while satisfying the reference SNR. The range of the intensity of incident light corresponding to the valid response of a pixel may be referred to as a dynamic range of the pixel. That is, the dynamic range of the pixel may refer to the intensity range of the incident light in which each pixel has a valid response.

The response of the high-sensitivity pixel in response to an increase in the intensity of incident light is relatively large. Thus, the response graph of the high-sensitivity pixel in FIG. 2 has a relatively large slope until the response reaches the saturation level and has a fixed level corresponding to the saturation level regardless of the increase in the intensity of incident light after the response reaches the saturation level.

The response of the low-sensitivity pixel in response to an increase in the intensity of incident light is relatively small. Thus, the response graph of the low-sensitivity pixel in FIG. 2 has a relatively small slope until the response reaches the saturation level and has a fixed level corresponding to the saturation level regardless of the increase in the intensity of incident light after the response reaches the saturation level.

As illustrated in FIG. 2, a minimum value of a high-sensitivity pixel dynamic range (DR_H) may be less than the minimum value of a low-sensitivity pixel dynamic range (DR_L), and a maximum value of the high-sensitivity pixel dynamic range (DR_H) may be less than the maximum value of the low-sensitivity pixel dynamic range (DR_L). Therefore, in a low-luminance range in which the intensity of incident light is relatively small, the high-sensitivity pixel may be more suitable to detecting the intensity of incident light. In a high-luminance range in which the intensity of incident light is relatively large, the low-sensitivity pixel may be more suitable to detecting the intensity of incident light.

High dynamic range (HDR) can be implemented using both the response of the high-sensitivity pixel suitable for the low-luminance range and the response of the low-sensitivity pixel suitable for the high-luminance range. In other words, as compared to using only one of the high-sensitivity pixel and the low-sensitivity pixel is used, using both the high-sensitivity pixel and the low-sensitivity pixel can allow the overall pixel array to have a high dynamic range (HDR) corresponding to a specific range from the minimum value of the high-sensitivity pixel dynamic range to the maximum value of the low-sensitivity pixel dynamic range. To this end, at least a portion of the high-sensitivity pixel dynamic range and at least a portion of the low-sensitivity pixel dynamic range may overlap each other.

In some implementations, a high dynamic range (HDR) image corresponding to the high dynamic range (HDR) can be synthesized using the high-sensitivity pixel (HPX) and the low-sensitivity pixel (LPX) by using: a method for synthesizing the HDR image by calculating (e.g., summing) the HPX response and the LPX response; and/or a method for forming an image based on the HPX response at a low-luminance level and forming an image based on the LPX response at a high-luminance level.

As shown in FIG. 2, when the sensitivity of each pixel (i.e., a slope of response) is adjusted, the dynamic range of the corresponding pixel can be adjusted. The sensitivity of the pixel may be determined based on one or more sensitivity items. Here, the sensitivity items include at least one of: the amount of light exposure; light transmittance; exposure time; conversion gain; and analog gain, which are indicative of the pixel sensitivity. Accordingly, the HDR controller 300 can adjust the dynamic range of each pixel by adjusting controllable items from among the sensitivity items discussed above. The controllable item can include sensitivity items that can be controlled by the HDR controller 300.

As the dynamic range is widened, there is an advantage in that a valid response corresponding to incident light having a wide luminance range can be obtained. However, the widening of the dynamic range may lead to an excessive change in the exposure time and in the time point where incident light is captured by the respective pixels, causing the incident light to be captured by the respective pixels at different time points. As a result, motion artifacts of a fast moving object (e.g., a target object moving at high speed) may increase. If the dynamic range is unnecessarily extended to the low luminance range while photographing a very bright scene, responses of the high-sensitivity pixels may be saturated, worsening the overall image quality.

Therefore, the HDR controller 300 may control at least one of the aperture driver 40 and the image sensing device 100 based on characteristics of the scene and characteristics of the controllable items, so that the pixels of the image sensing device 100 can have the optimal dynamic range. In the context of this patent document, the word optimal that is used in conjunction with the dynamic range is used to indicate a dynamic range that provides a better performance for the imaging device.

Figure 3:
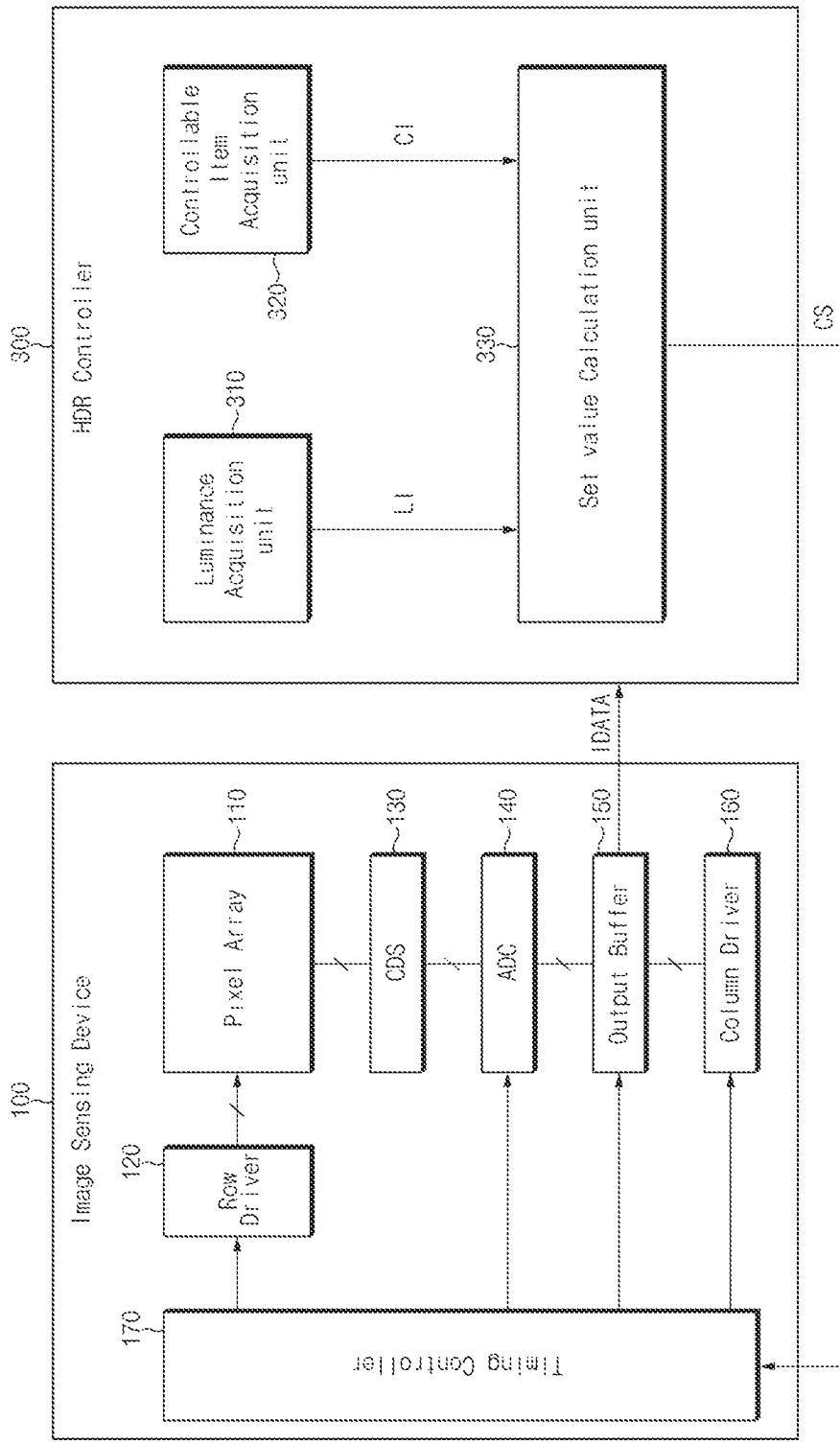
FIG. 3 is a block diagram illustrating an example of the image sensing device and a high dynamic range (HDR) controller shown in FIG. 1 based on some implementations of the disclosed technology.

FIG. 3 is a block diagram illustrating an example of the image sensing device and the high dynamic range (HDR) controller 300 shown in FIG. 1 based on some implementations of the disclosed technology.

Referring to FIG. 3, the image sensing device 100 may include a pixel array 110, a row driver 120, a correlated double sampler (CDS) 130, an analog-digital converter (ADC) 140, an output buffer 150, a column driver 160 and a timing controller 170. The components of the image sensing device 100 illustrated in FIG. 1 are discussed by way of example only, and this patent document encompasses numerous other changes, substitutions, variations, alterations, and modifications.

The pixel array 110 may include a plurality of unit imaging pixels arranged in rows and columns. In one example, the plurality of unit imaging pixels can be arranged in a two dimensional pixel array including rows and columns. In another example, the plurality of unit imaging pixels can be arranged in a three dimensional pixel array. The plurality of unit pixels may convert an optical signal into an electrical signal on a unit pixel basis or a pixel group basis, where unit pixels in a pixel group share at least certain internal circuitry. The pixel array 110 may receive driving signals, including a row selection signal, a pixel reset signal and a transmission signal, from the row driver 120. Upon receiving the driving signal, corresponding imaging pixels in the pixel array 110 may be activated to perform the operations corresponding to the row selection signal, the pixel reset signal, and the transmission signal.

The row driver 120 may activate the pixel array 110 to perform certain operations on the imaging pixels in the corresponding row based on commands and control signals provided by controller circuitry such as the timing controller 170. In some implementations, the row driver 120 may select one or more imaging pixels arranged in one or more rows of the pixel array 110. The row driver 120 may generate a row selection signal to select one or more rows among the plurality of rows. The row decoder 120 may sequentially enable the pixel reset signal for resetting imaging pixels corresponding to at least one selected row, and the transmission signal for the pixels corresponding to the at least one selected row. Thus, a reference signal and an image signal, which are analog signals generated by each of the imaging pixels of the selected row, may be sequentially transferred to the CDS 130. The reference signal may be an electrical signal that is provided to the CDS 130 when a sensing node of an imaging pixel (e.g., floating diffusion node) is reset, and the image signal may be an electrical signal that is provided to the CDS 130 when photocharges generated by the imaging pixel are accumulated in the sensing node. The reference signal indicating unique reset noise of each pixel and the image signal indicating the intensity of incident light may be generically called a pixel signal as needed.

CMOS image sensors may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured. In some embodiments of the disclosed technology, the CDS 130 may sequentially sample and hold voltage levels of the reference signal and the image signal, which are provided to each of a plurality of column lines from the pixel array 110. That is, the CDS 130 may sample and hold the voltage levels of the reference signal and the image signal which correspond to each of the columns of the pixel array 110.

In some implementations, the CDS 130 may transfer the reference signal and the image signal of each of the columns as a correlate double sampling signal to the ADC 140 based on control signals from the timing controller 170.

The ADC 140 is used to convert analog CDS signals into digital signals. In some implementations, the ADC 140 may convert the correlate double sampling signal generated by the CDS 130 for each of the columns into a digital signal, and output the digital signal.

The ADC 140 may include a plurality of column counters. Each column of the pixel array 110 is coupled to a column counter, and image data can be generated by converting the correlate double sampling signals received from each column into digital signals using the column counter. In another embodiment of the disclosed technology, the ADC 140 may include a global counter to convert the correlate double sampling signals corresponding to the columns into digital signals using a global code provided from the global counter.

The output buffer 150 may temporarily hold the column-based image data provided from the ADC 140 to output the image data. In one example, the image data provided to the output buffer 150 from the ADC 140 may be temporarily stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer upon receiving a control signal from the timing controller 170, and sequentially output the image data, which are temporarily stored in the selected column of the output buffer 150. In some implementations, upon receiving an address signal from the timing controller 170, the column driver 160 may generate a column selection signal based on the address signal and select a column of the output buffer 150, outputting the image data as an output signal from the selected column of the output buffer 150.

The timing controller 170 may control operations of the row driver 120, the ADC 140, the output buffer 150 and the column driver 160.

The timing controller 170 may provide the row driver 120, the CDS 130, the ADC 140, the output buffer 150, and the column driver 160 with a clock signal required for the operations of the respective components of the image sensing device 100, a control signal for timing control, and address signals for selecting a row or column. In an embodiment of the disclosed technology, the timing controller 170 may include a logic control circuit, a phase lock loop (PLL) circuit, a timing control circuit, a communication interface circuit and others.

The timing controller 170 may control the sensitivity of each of the pixels included in the pixel array 110. The sensitivity of each pixel may be determined by light transmittance, exposure time, conversion gain, and analog gain. Here, the light transmittance may refer to a ratio of the intensity of light reaching a device (i.e., a photoelectric conversion element to be described later) that converts light into photocharges within the pixel with respect to the intensity of light incident upon the pixel. The exposure time may refer to a time required to convert light incident upon the pixel into photocharges. The conversion gain may refer to a ratio of a pixel signal (i.e., voltage) obtained by converting photocharges to the amount of photocharges generated by the pixel. The analog gain may refer to a ratio of a digital value (i.e., image data) obtained by converting the pixel signal to a level of the pixel signal that is output from the pixel. The higher the light transmittance, the higher the pixel sensitivity. The shorter the exposure time, the higher the pixel sensitivity. The higher the conversion gain, the higher the pixel sensitivity. In addition, the higher the analog gain, the higher the pixel sensitivity. Conversely, the lower the light transmittance, the lower the pixel sensitivity. The longer the exposure time, the lower the pixel sensitivity. The lower the conversion gain, the lower the pixel sensitivity. In addition, the lower the analog gain, the lower the pixel sensitivity.

The light transmittance may have a fixed value that is predetermined for each pixel. The exposure time, the conversion gain, and the analog gain may be controllable items. In order to control the exposure time or the conversion gain of each pixel, the timing controller 170 may control the row driver for supplying a control signal to the pixel array 110. In order to control the analog gain of each pixel, the timing controller 170 may control the ADC 40 configured to perform analog-to-digital conversion (ADC).

The disclosed technology can be implemented in some embodiments to control the exposure time, the conversion gain, and the analog gain and control the sensitivity of each pixel by the timing controller 170 as will be discussed below with reference to FIG. 6.

The HDR controller 300 may include a luminance acquisition unit 310, a controllable item acquisition unit 320, and a set value calculation unit 330.

The luminance acquisition unit 310 may acquire luminance information associated with a target region from among a captured scene image based on image data (IDATA) generated by the image sensing device 100. In this case, the captured scene may be represented by image data (IDATA) corresponding to a frame that is photographed by the image sensing device 100. That is, the scene may be an image captured by the entire pixel array 110 during a predetermined period corresponding to the frame, and pixels belonging to the target region corresponding to at least a portion of the scene image may be defined as target pixels. The target region may refer to a region designated by a user (e.g., a specific subject) as a region included in the scene image, may refer to a region (i.e., the brightest region) in which the image data (IDATA) having a high luminance from among the scene image is concentrated, or may refer to a region corresponding to the entire scene image. Further, the luminance may refer to the value of image data (IDATA). In some other implementations, the luminance acquisition unit 310 may also acquire luminance of the target region using a separate device (e.g., a photometric sensor, other camera devices, etc.).

The controllable item acquisition unit 320 may acquire controllable items from among the amount of light exposure, exposure time, conversion gain, and analog gain. Here, the amount of light exposure may be a value that is determined according to the degree of opening of the aperture 20 under control of the aperture driver 40. Each of the amount of light exposure, the exposure time, the conversion gain, and the analog gain may be a fixed value that is predetermined or a controllable value. For example, in a night photographing mode, a system (e.g., an application processor) may fix or set the amount of light exposure to a maximum amount of light exposure. In another example, in a video mode or a high-speed photographing mode in which a time allocated to each frame is very short, the system may limit the exposure time to be less than or equal to a predetermined time, or may fix the exposure time to a constant time. In order to reduce power consumption required for controlling and image processing of the image sensing device 100, the system may limit the controlling of at least one of the conversion gain and the analog gain.

The set value calculation unit 330 may calculate a set value for each controllable item based on the target-region luminance received from the luminance acquisition unit 310 and the controllable items received from the controllable item acquisition unit 320, and may generate a control signal (CS) indicating the calculated set value. Here, the set value may refer to information for controlling the controllable items (e.g., the amount of light exposure, exposure time, conversion gain, and analog gain).

Figure 10:
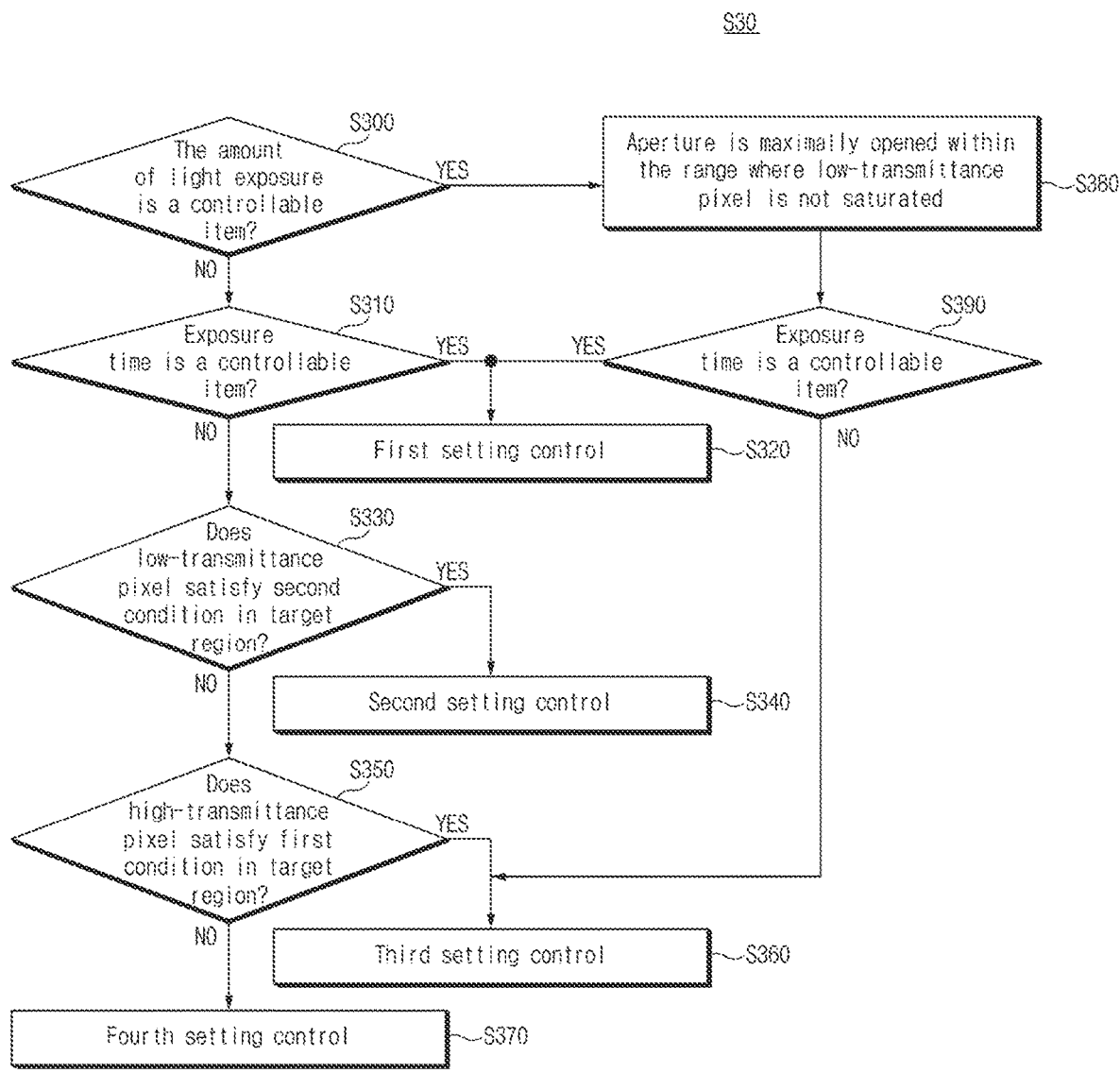
FIG. 10 is a flowchart illustrating an example operation S30 shown in FIG. 9 based on some implementations of the disclosed technology.

A detailed operation of the set value calculation unit 330 will be described later with reference to FIG. 10.

Figure 4:
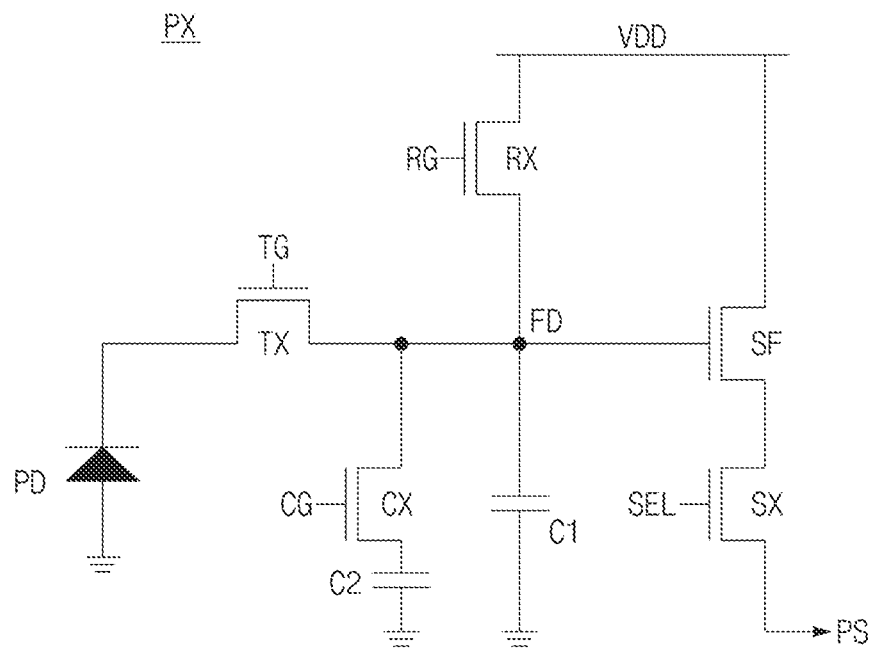
FIG. 4 is a circuit diagram illustrating an example of pixels included in a pixel array shown in FIG. 3 based on some implementations of the disclosed technology.

FIG. 4 is a circuit diagram illustrating an example of pixels included in the pixel array 110 shown in FIG. 3 based on some implementations of the disclosed technology.

Referring to FIG. 4, the pixel (PX) may be any one of the plurality of pixels included in the pixel array 110. Although FIG. 4 shows only one pixel (PX) for convenience of description, it should be noted that other pixels may also have structures and perform operations that are similar or identical to those of the pixel (PX).

The pixel (PX) may include a photoelectric conversion element (PD), a transfer transistor (TX), a reset transistor (RX), a floating diffusion region (FD), a conversion gain (CG) transistor (CX), first and second capacitors C1-C2, a source follower transistor (SF), and a select transistor (SX). Although FIG. 4 shows that the pixel (PX) includes only one photoelectric conversion element (PD) by way of example, it should be noted that the pixel (PX) can also be a shared pixel including a plurality of photoelectric conversion elements. In this case, the plurality of transfer transistors may be provided to correspond to the photoelectric conversion elements, respectively.

Each of the photoelectric conversion elements (PDs) may generate and accumulate photocharges corresponding to the intensity of incident light. For example, each of the photoelectric conversion elements (PDs) may be implemented as a photodiode, a phototransistor, a photogate, a pinned photodiode or a combination thereof.

If the photoelectric conversion element (PD) is implemented as a photodiode, the photoelectric conversion element (PD) may be a region that is doped with second conductive impurities (e.g., N-type impurities) in a substrate including first conductive impurities (e.g., P-type impurities).

The transfer transistor (TX) may be coupled between the photoelectric conversion element (PD) and the floating diffusion region (FD). The transfer transistor (TX) may be turned on or off in response to a transfer control signal (TG). If the transfer transistor (TX) is turned on, photocharges accumulated in the corresponding photoelectric conversion element (PD) can be transmitted to the floating diffusion region (FD).

The reset transistor (RX) may be disposed between the floating diffusion region (FD) and the power-supply voltage (VDD), and the voltage of the floating diffusion region (FD) can be reset to the power-supply voltage (VDD) in response to a reset control signal (RG).

The floating diffusion region (FD) may accumulate photocharges received from the transfer transistor (TX). The floating diffusion region (FD) can be coupled to the first capacitor (C1) connected to a ground terminal. For example, the floating diffusion region (FD) may be a region that is doped with second conductive impurities (e.g., N-type impurities) in a substrate (e.g., a P-type substrate) including first conductive impurities. In this case, the substrate and the impurity doped region can be modeled as the first capacitor (C1) acting as a junction capacitor.

The CG transistor (CX) may be coupled between the floating diffusion region (FD) and the second capacitor (C2), and may selectively connect the second capacitor (C2) to the floating diffusion region (FD) in response to a CG control signal (CG). The second capacitor (C2) may include at least one of a Metal-Insulator-Metal (MIM) capacitor, a Metal-Insulator-Polysilicon (MIP) capacitor, a Metal-Oxide-Semiconductor (MOS) capacitor, and a junction capacitor. When the CG transistor (CX) is turned off, the floating diffusion region (FD) may have electrostatic capacity corresponding to capacitance of the first capacitor (C1). When the CG transistor (CX) is turned on, the floating diffusion region (FD) may have electrostatic capacitance corresponding to the sum of capacitance of the first capacitor (C1) and capacitance of the second capacitor (C2). That is, the CG transistor (CX) may control capacitance of the floating diffusion region (FD).

Although FIG. 4 illustrates only one CG transistor (CX) for convenience of description, it should be noted that a plurality of CG transistors can also be used. In this case, the capacitance of the floating diffusion region (FD) may vary.

The source follower transistor (SF) may be coupled between the power-supply voltage (VDD) and the select transistor (SX), may amplify a change in electric potential or voltage of the floating diffusion region (FD) that has received photocharges accumulated in the photoelectric conversion element (PD), and may transmit the amplified result to the selection transistor (SX).

The select transistor (SX) may be coupled between the source follower transistor (SF) and the output signal line, and may be turned on by a selection control signal (SEL), so that the selection transistor (SX) can output the electrical signal received from the source follower transistor (SF) as the pixel signal (PS).

Figure 5:
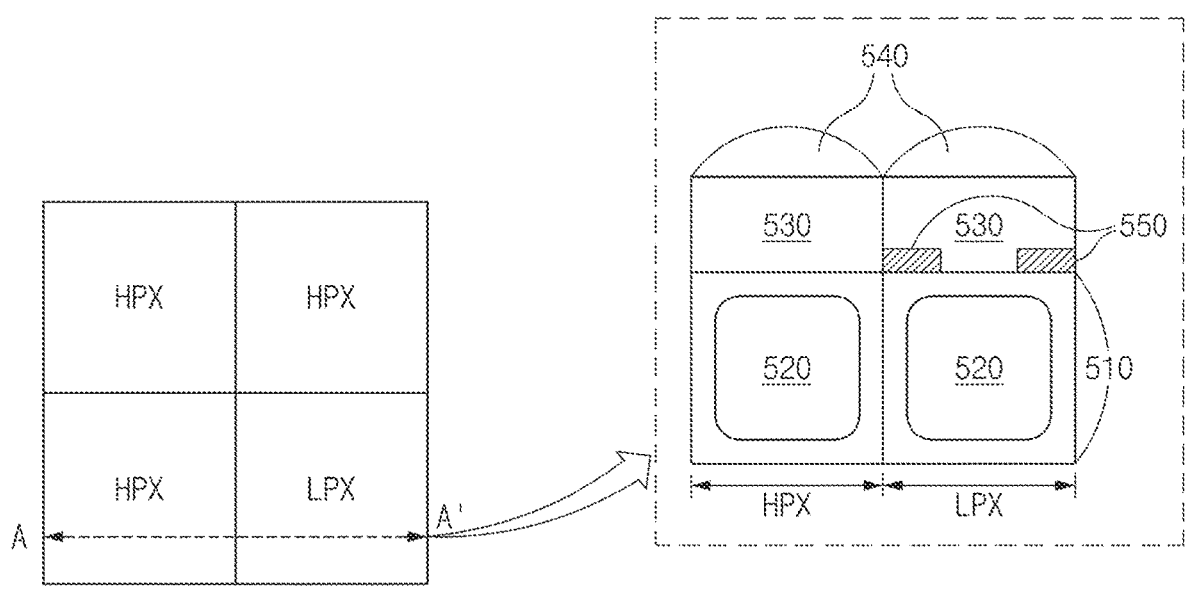
FIG. 5 is a diagram illustrating an example that adjusts sensitivity of a pixel based on a difference in light transmittance.

FIG. 5 is a conceptual diagram illustrating an example of a method for adjusting sensitivity of each pixel based on a difference in light transmittance.

Referring to FIG. 5, a high light-transmittance pixel (HPX) has a relatively high light-transmittance and a low light-transmittance pixel (LPX) has a relatively low light-transmittance. In other words, three high light-transmittance pixels (HPXs) and only one low light-transmittance pixel (LPX) may be arranged in a (2×2) matrix (e.g., a unit matrix). Each of the high light-transmittance pixel (HPX) and the low light-transmittance pixel (LPX) may have a structure corresponding to the circuit diagram of FIG. 4. In some implementations, each of the high light-transmittance pixel (HPX) and the low light-transmittance pixel (LPX) may include a photoelectric conversion element and a transfer transistor, and the remaining constituent elements other than the photoelectric conversion element and the transfer transistor may be implemented as a shared pixel structure shared by four pixels.

In some implementations, the high light-transmittance pixel (HPX) and the low light-transmittance pixel (LPX) may be pixels that sense light of the same color (e.g., red, blue, or green). In this case, the pixel array may form a quad Bayer pattern structure on a (2×2) matrix basis.

Referring to the cross-sectional view of FIG. 5, the high light-transmittance pixel (HPX) and the low light-transmittance pixel (LPX) taken along the line A-A' may include a substrate 510, at least one photoelectric conversion element 520, at least one optical filter 530, at least one microlens 540, and at least one light blocking structure 550.

For example, the substrate 510 may be a P-type or N-type bulk substrate, may be a substrate formed by growing a P-type or N-type epitaxial layer on the P-type bulk substrate, or may be a substrate formed by growing a P-type or N-type epitaxial layer on the N-type bulk substrate.

The photoelectric conversion element 520 may be formed in the substrate 510, and may correspond to the photoelectric conversion element (PD) shown in FIG. 4. That is, the photoelectric conversion element 520 may generate and accumulate photocharges corresponding to the intensity of incident light having penetrated the microlens 540 and the optical filter 530.

The optical filters 530 may selectively transmit light (e.g., red light, green light, blue light, magenta light, yellow light, cyan light, infrared (IR) light) having a wavelength band to be transmitted. In this case, the wavelength band may refer to a wavelength band of light to be selectively transmitted by the corresponding optical filter. For example, each of the optical filters 530 may include a colored photosensitive material corresponding to a specific color, or may include thin film layers that are alternately arranged. The optical filters included in the pixel array 110 may be arranged to correspond to the pixels arranged in a matrix array including a plurality of rows and a plurality of columns, resulting in formation of an optical filter array.

Each of the microlenses 540 may be formed over each of the optical filters 530, and may increase the light gathering power of incident light, resulting in an increase in the light reception (Rx) efficiency of the photoelectric conversion element 520.

The light blocking structure 550 may be disposed between one surface of the substrate 510 and the optical filter 530, so that at least a portion of incident light that has penetrated the optical filter 530 in the low light-transmittance pixel (LPX) is blocked by the light blocking structure without being transferred to the photoelectric conversion element 520. The light blocking structure 550 may include at least one of a material (e.g., silver or aluminum) having a high light reflectivity and a material (e.g., tungsten) having a high light absorption rate.

The total area of the low light-transmittance pixel (LPX) may be defined as the sum of a blocked area of a region where the light blocking structure 550 is not disposed and an open area of a region where the light blocking structure 550 is disposed. Light transmittance of the low light-transmittance pixel (LPX) may be determined according to a ratio between the blocked area and the open area.

The high light-transmittance pixel (HPX), which does not include the light blocking structure 550, may have a higher light transmittance than low light-transmittance pixel (LPX) including the light blocking structure 550.

That is, when incident light having the same intensity is incident upon the high light-transmittance pixel (HPX) and the low light-transmittance pixel (LPX), the intensity of light transferred to the photoelectric conversion element 520 of the low light-transmittance pixel (LPX) may be less than the intensity of light transferred to the photoelectric conversion element 520 of the high light-transmittance pixel (HPX).

In addition, the intensity of light transferred to the photoelectric conversion element 520 of the low light-transmittance pixel (LPX) may increase with a relatively low slope in response to the increasing intensity of incident light. The intensity of light transferred to the photoelectric conversion element 520 of the high light-transmittance pixel (HPX) may increase with a relatively high slope in response to the increasing intensity of incident light.

Since each of the intensity of light transferred to the photoelectric conversion element 520 of the low light-transmittance pixel (LPX) and the intensity of light transferred to the photoelectric conversion element 520 of the high light-transmittance pixel (HPX) is converted into a pixel signal, the response of the low light-transmittance pixel (LPX) may be similar to the response of the low-sensitivity pixel shown in FIG. 2, and the response of the high light-transmittance pixel (HPX) may be similar to the response of the high-sensitivity pixel shown in FIG. 2.

Although the light blocking structure 550 shown in FIG. 5 is disposed at the edge of the low light-transmittance pixel (LPX), other implementations are also possible. For example, the light blocking structure 550 may be disposed at any location of the low light-transmittance pixel (LPX), and the light blocking structure 550 may also be disposed in the entire region of the low light-transmittance pixel (LPX) in a situation where the light blocking structure 550 is partially blocked.

The image sensing device 100 based on some implementations of the disclosed technology can generate the HDR image using only one image by implementing the low-sensitivity pixel and the high-sensitivity pixel within only one pixel array 110.

Figure 6:
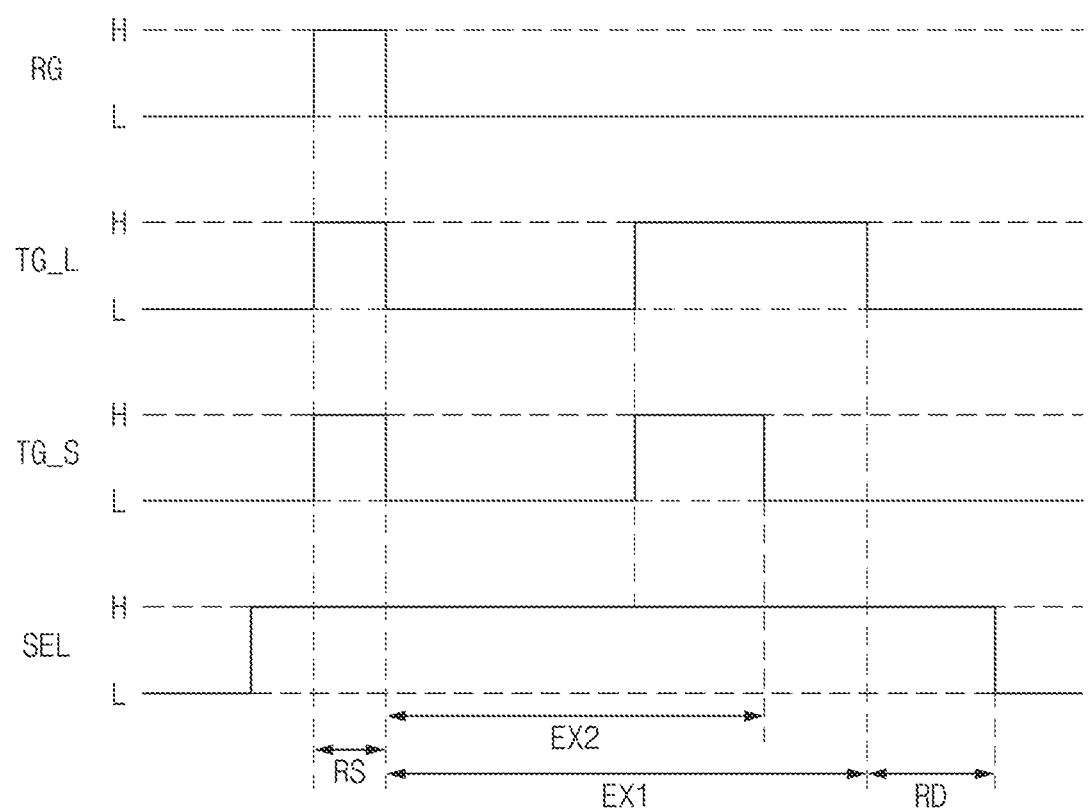
FIG. 6 is a timing diagram illustrating an example method for adjusting sensitivity of each pixel based on a difference in exposure time.

FIG. 6 is a timing diagram illustrating an example of a method for adjusting sensitivity of each pixel based on a difference in exposure time.

Referring to FIG. 6, it is assumed that at least one long-exposure pixel having a relatively long exposure time and at least one short-exposure pixel having a relatively short exposure time are disposed together in one row of the pixel array 110 for convenience of description. The pixel array 110 may be activated by the row driver 120 on a row basis, so that the long-exposure pixel and the short-exposure pixel may receive the same reset signal (RG) and the same row selection signal (SEL). However, in order to allow the long-exposure pixel and the short-exposure pixel to have different exposure times, the long-exposure pixel and the short-exposure pixel may receive different transfer signals such as a first transfer signal (TG_L) and a second transfer signal (TG_S). Although not shown in the drawings, the long-exposure pixel and the short-exposure pixel may have the same CG signal (CG) or different CG signals (CGs).

Each of the reset signal (RG), the row selection signal (SEL), the first transfer signal (TG_L), and the second transfer signal (TG_S) may have a logic low level (L) and a logic high level (H). The transistor configured to receive a signal having a logic low level (L) may be turned off, and the transistor configured to receive a signal having a logic high level (H) may be turned on.

An operation period (i.e., a time period for operation) of each of the long-exposure pixel and the short-exposure pixel may include a reset period (RS), an exposure period, and a readout period (RD). In other implementations, the operation period may further include the readout period (RD) for generating a reference signal after the reset period (RS).

The reset period (RS) may be a time period in which photocharges that remain unused in the corresponding pixel are removed and the floating diffusion region (FD) is reset to the power-supply voltage (VDD). In the reset period (RS), each of the reset signal (RG), the row selection signal (SEL), the first transfer signal (TG_L), and the second transfer signal (TG_S) may have a logic high level (H).

The exposure period EX1 may be a time period in which a photoelectric conversion element (PD) of the long-exposure pixel generates and accumulates photocharges corresponding to the intensity of incident light and the accumulated photocharges are then transmitted to the floating diffusion region (FD). The exposure period EX2 may be a time period in which a photoelectric conversion element (PD) of the short-exposure pixel generates and accumulates photocharges corresponding to the intensity of incident light and the accumulated photocharges are then transmitted to the floating diffusion region (FD).

After the reset period (RS), the photoelectric conversion element (PD) of the long-exposure pixel may generate and accumulate photocharges corresponding to the intensity of incident light. Until the first transfer signal (TG_L) transitions from the logic high level (H) to the logic low level (L), the transfer transistor of the long-exposure pixel may transmit photocharges from the photoelectric conversion element (PD) of the long-exposure pixel to the floating diffusion region (FD) of the long-exposure pixel. In other words, the long-exposure pixel may accumulate photocharges that have been generated during the first exposure period (EX1) in the floating diffusion region (FD).

After the reset period (RS), the photoelectric conversion element (PD) of the short-exposure pixel may generate and accumulate photocharges corresponding to the intensity of incident light. Until the second transfer signal (TG_S) transitions from the logic high level (H) to the logic low level (L), the transfer transistor of the short-exposure pixel may transmit photocharges from the photoelectric conversion element (PD) of the short-exposure pixel to the floating diffusion region (FD) of the short-exposure pixel. In other words, the short-exposure pixel may accumulate photocharges that have been generated during the second exposure period (EX2) in the floating diffusion region (FD). Each of the exposure periods EX1 and EX2 may refer to a time period in which photocharges are generated and accumulated in each pixel, and the transfer signal applied to each pixel may determine the length of the exposure period.

The readout period (RD) may refer to a time period in which each of the long-exposure pixel and the short-exposure pixel generates electrical signals corresponding to the photocharges accumulated in the floating diffusion region (FD) and then output the electrical signals as a pixel signal (PS).

A time point where the first transfer signal (TG_L) transitions from the logic high level (H) to the logic low level (L) may be later than a time point where the second transfer signal (TG_S) transitions from the logic high level (H) to the logic low level (L). Accordingly, the first exposure period (EX1) may be longer than the second exposure period (EX2).

In other words, when incident light having the same intensity is incident upon the long-exposure pixel and the short-exposure pixel, the amount of photocharges accumulated in the floating diffusion region (FD) of the short-exposure pixel may be smaller than the amount of photocharges accumulated in the floating diffusion region (FD) of the long-exposure pixel.

In addition, the amount of photocharges accumulated in the floating diffusion region (FD) of the short-exposure pixel may increase with a relatively low slope in response to the increasing intensity of incident light. The amount of photocharges accumulated in the floating diffusion region (FD) of the long-exposure pixel may increase with a relatively high slope in response to the increasing intensity of incident light.

Since each of the amount of photocharges accumulated in the floating diffusion region (FD) of the short-exposure pixel and the amount of photocharges accumulated in the floating diffusion region (FD) of the long-exposure pixel is converted into a pixel signal, the response of the short-exposure pixel may follow the response of the low-sensitivity pixel shown in FIG. 2, and the response of the long-exposure pixel may follow the response of the high-sensitivity pixel shown in FIG. 2.

The image sensing device 100 based on another embodiment of the disclosed technology can generate the HDR image using only one image by implementing the low-sensitivity pixel and the high-sensitivity pixel within only one pixel array 110.

Figure 7:
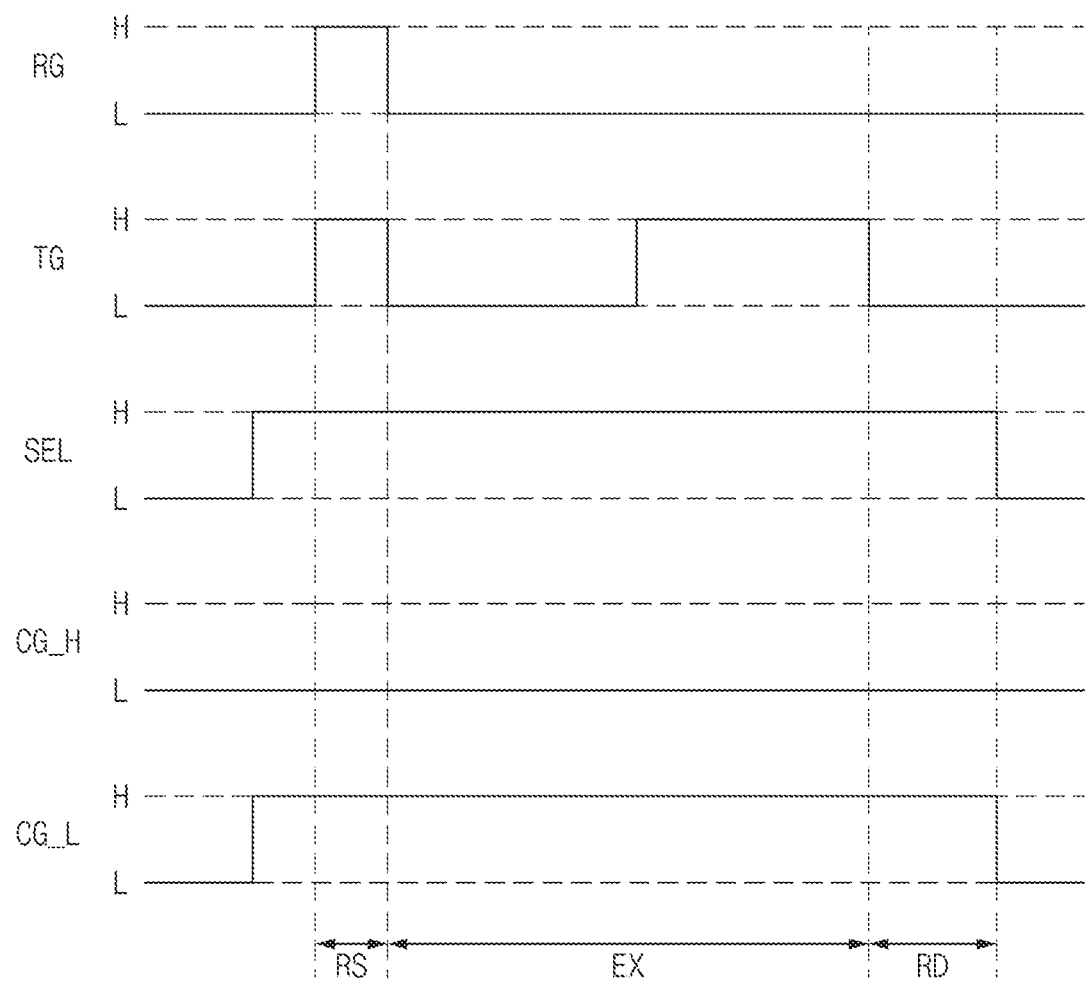
FIG. 7 is a timing diagram illustrating an example method for adjusting sensitivity of each pixel based on a difference in conversion gain.

FIG. 7 is a timing diagram illustrating an example of a method for adjusting sensitivity of each pixel based on a difference in conversion gain.

Referring to FIG. 7, it is assumed that at least one high conversion gain (CG) pixel having a relatively high conversion gain and at least one low CG pixel having a relatively low conversion gain are disposed together in one row of the pixel array 110 for convenience of description and better understanding of the disclosed technology. The pixel array 110 may be activated by the row driver 120 on a row basis, so that the high CG pixel and the low CG pixel may receive the same reset signal (RG) and the same row selection signal (SEL). For convenience of description, it is assumed that the high CG pixel and the low CG pixel shown in FIG. 7 receive the same transfer signal (TG), but the high CG pixel and the low CG pixel may also receive different transfer signals TG_L and TG_S as shown in FIG. 6. In order to allow the high CG pixel and the low CG pixel to have different conversion gains, the high CG pixel may receive a first CG signal (CG_H) and the low CG pixel may receive a second CG signal (CG_L).

The operation period (i.e., a time period for operation) of each of the high CG pixel and the low CG pixel may include a reset period (RS), an exposure period, and a readout period (RD). The operations in each of the reset period (RS), the exposure period, and the readout period (RD) are substantially the same as those of FIG. 6, and as such redundant description thereof will herein be omitted for convenience of description.

During the reset period (RS), the exposure period, and the readout period (RD), the high CG pixel may receive a first CG signal (CG_H) kept at a logic low level (L), and the low CG pixel may receive a second CG signal (CG_L) kept at a logic high level (H). Accordingly, capacitance of the floating diffusion region (FD) of the high CG pixel may correspond to capacitance of the first capacitor (C1), and capacitance of the floating diffusion region (FD) of the low CG pixel may correspond to the sum of the capacitance of the first capacitor (C1) and the capacitance of the second capacitor (C2).

In the readout period (RD), the photocharges accumulated in the floating diffusion region (FD) may generate a change in voltage of the floating diffusion region (FD), and such voltage change of the floating diffusion region (FD) may be converted into electrical signals by the source follower transistor (SF). In this case, the degree of voltage change in the floating diffusion region (FD) may be determined by capacitance of the floating diffusion region (FD). In association with the same amount of photocharges, as the capacitance of the floating diffusion region (FD) decreases, the voltage change of the floating diffusion region (FD) may increase, and as the capacitance of the floating diffusion region (FD) increases, the voltage change of the floating diffusion region (FD) may decrease.

That is, when the same amount of photocharges is accumulated in the floating diffusion region (FD) of the high CG pixel and the floating diffusion region (FD) of the low CG pixel, the magnitude of a pixel signal generated by the high CG pixel may be greater than the magnitude of a pixel signal generated by the low CG pixel.

In addition, the magnitude of the pixel signal of the low CG pixel may increase with a relatively low slope in response to the increasing amount of photocharges, and the magnitude of the pixel signal of the high CG pixel may increase with a relatively high slope in response to the increasing amount of photocharges.

In addition, each of the magnitude of the pixel signal of the low CG pixel and the magnitude of the pixel signal of the high CG pixel may be converted into image data (IDATA), so that the response of the low CG pixel may follow the response of the low-sensitivity pixel shown in FIG. 2 and the response of the high CG pixel may follow the response of the high-sensitivity pixel shown in FIG. 2.

The image sensing device 100 based on still another embodiment of the disclosed technology can simultaneously implement the low-sensitivity pixel and the high-sensitivity pixel within only one pixel array 110, and can thus form (or generate) the HDR image using only one image.

Figure 8:
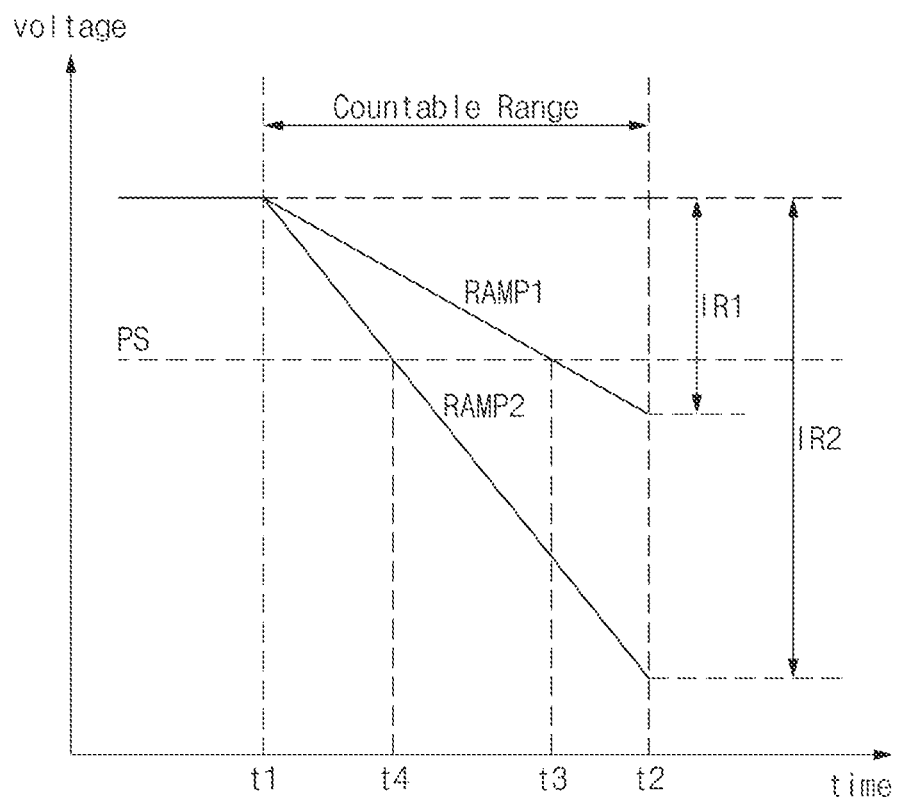
FIG. 8 is a graph illustrating an example method for adjusting sensitivity of each pixel based on a difference in analog gain.

FIG. 8 is a graph illustrating an example of a method for adjusting sensitivity of each pixel based on a difference in analog gain.

Referring to FIG. 8, the ADC 140 may be implemented as a ramp-compare type ADC. In some implementations, the ramp-compare type ADC may include a comparator for comparing a ramp signal falling over time with an analog pixel signal, and a counter for performing counting until the ramp signal matches the analog pixel signal. In addition, the ADC 140 may be independently provided for each column line to which pixels belonging to the same column of the pixel array 110 are connected. The respective ADCs 140 may perform analog-to-digital conversion (ADC) using the same or different ramp signals.

In the graph shown in FIG. 8, the X-axis may represent time, and the Y-axis may represent voltage. A first ramp signal RAMP1 and a second ramp signal RAMP2 are depicted in FIG. 8. Each of the first and second ramp signals RAMP1 and RAMP2 may be kept at a constant voltage until reaching a first time point (t1), and may then linearly decrease after lapse of the first time point (t1).

The slope of the first ramp signal (RAMP1) may be less than the slope of the second ramp signal (RAMP2). The slope of the first ramp signal (RAMP1) and the slope of the second ramp signal (RAMP2) can be adjusted by controlling a resistance value of a variable resistor included in a ramp circuit configured to generate such ramp signals under control of the timing controller 170, but is not limited thereto.

A time period from the first time point (t1) (where each of the first and second ramp signals RAMP1 and RAM P2 begins to linearly decrease) to the second time point (t2) located after a predetermined time from the first time point (t1) may be defined as a countable range. The countable range may refer to a maximum time period in which the counter of the ADC 140 can perform counting. The countable range may be determined in response to a maximum number of counts of the counter per unit time, and may represent the output range of the ADC 140.

The input range of the ADC 140 may refer to a voltage range of the pixel signal that can be effectively converted into image data (IDATA) belonging to a predetermined output range (e.g., digital number (DN) of 0-1023) of the ADC 140.

When the first ramp signal (RAMP1) is input to the comparator, the voltage range of the pixel signal that can be effectively converted into pixel data within a countable time or range determined by the output range of the ADC 140 may correspond to a first input range (IR1). In the example of FIG. 8, when the first ramp signal (RAMP1) and the pixel signal (PS) are input to the comparator, the counter starts counting from the first time point (t1) and continuously performs counting until reaching a third time point (t3) where the pixel signal (PS) reaches a value that is equal to or higher than the first ramp signal (RAMP1), so that the accumulated counting value can be output as image data. The pixel signal (PS) may be a signal belonging to the first input range (IR1), and may be effectively converted into image data. In this case, the operation of effectively converting the pixel signal (PS) into image data may represent that the pixel signal (PS) is converted into image data indicating the voltage of the pixel signal (PS). If the pixel signal (PS) has a voltage less than the first ramp signal (RAMP1) at the second time point (t2), the pixel signal (PS) cannot be effectively converted into pixel data.

When the second ramp signal (RAMP2) is input to the comparator, the voltage range of the pixel signal that can be effectively converted into pixel data within a countable time determined by the output range of the ADC 140 may correspond to a second input range (IR2). In the example of FIG. 8, when the second ramp signal (RAMP2) and the pixel signal (PS) are input to the comparator, the counter starts counting from the first time point (t1) and continuously performs counting until reaching a fourth time point (t4) where the pixel signal (PS) reaches a value that is equal to or higher than the second ramp signal (RAMP2), so that the accumulated counting value can be output as image data.

One pixel connected to the ADC 140 that performs ADC using the first ramp signal (RAMP1) will hereinafter be referred to as a high AG pixel, and one pixel connected to the ADC 140 that performs ADC using the second ramp signal (RAMP2) will hereinafter be referred to as a low AG pixel.

In other words, for the pixel signal (PS) having the same voltage, image data that is output from the ADC 140 connected to the high AG pixel may be higher than image data that is output from the ADC 140 connected to the low AG pixel.

In addition, the image data output from the ADC 140 connected to the low AG pixel may increase with a relatively low slope in response to an increase of the pixel signal (e.g., the increase of the pixel signal may indicate the increase of an absolute value of the pixel signal), and the image data output from the ADC 140 connected to the high AG pixel may increase with a relatively high slope in response to an increase of the pixel signal.

Therefore, the response of the low AG pixel may follow the response of the low-sensitivity pixel shown in FIG. 2, and the response of the high AG pixel may follow the response of the high-sensitivity pixel shown in FIG. 2.

The image sensing device 100 based on still another embodiment of the disclosed technology can generate the HDR image using only one image by implementing the low-sensitivity pixel and the high-sensitivity pixel within only one pixel array 110.

Various embodiments in which the sensitivity of each pixel is adjusted in response to a difference in light transmittance, a difference in exposure time, a difference in conversion gain, and a difference in analog gain described in FIGS. 5 to 8 can be combined with each other as needed. For example, the CG transistor (CG) of the low light-transmittance pixel (LPX) having a relatively low light-transmittance may be turned on to reduce the slope of the response, or the CG transistor (CG) of the low light-transmittance pixel (LPX) may be turned off to increase the slope of the response. In addition, the sensitivity of each pixel can be adjusted using at least two selected from light transmittance, exposure time, conversion gain, and analog gain.

Although each of the light transmittance, the exposure time, the conversion gain, and the analog gain described in FIGS. 5 to 8 has been described as having only two kinds of pixels (e.g., a high light-transmittance pixel HPX and a low light-transmittance pixel LPX) for convenience of description, it should be noted that each of the light transmittance, the exposure time, the conversion gain, and the analog gain described in FIGS. 5 to 8 may have three or more types (e.g., a high light-transmittance pixel (HPX), a low light-transmittance pixel (LPX), and a medium-transmittance pixel).

Figure 9:
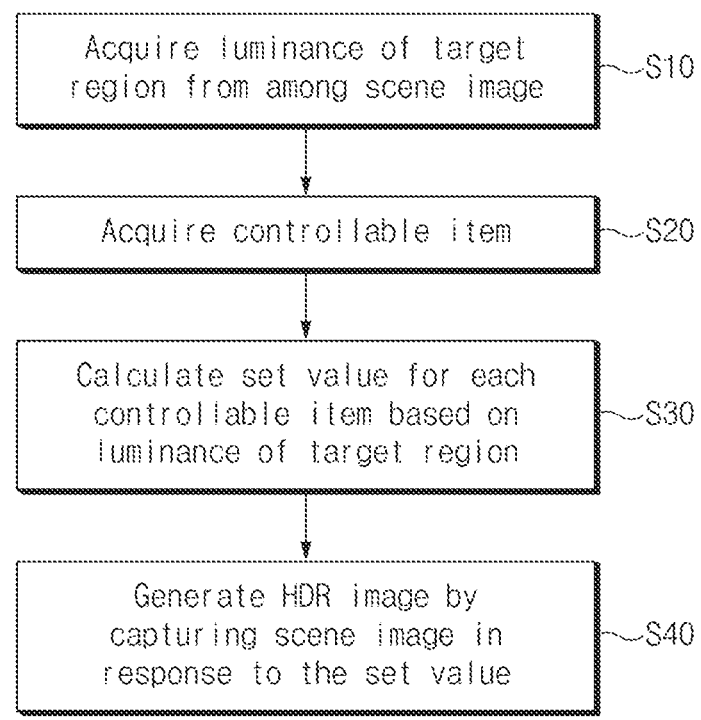
FIG. 9 is a flowchart illustrating an example method for forming an HDR image by the photographing device based on some implementations of the disclosed technology.

FIG. 9 is a flowchart illustrating an example of a method for forming an HDR image by the imaging device based on some implementations of the disclosed technology. FIG. 10 is a flowchart illustrating an example of the operation S30 shown in FIG. 9 based on some implementations of the disclosed technology.

Referring to FIG. 9, the luminance acquisition unit 310 may obtain luminance of the target region from among the scene image based on the image data (IDATA) generated by the image sensing device 100 (S10).

The controllable item acquisition unit 320 may obtain at least one controllable item from among the sensitivity items (e.g., the amount of light exposure, light transmittance, exposure time, conversion gain, and analog gain) (S20). Here, while the light transmittance item belongs to the sensitivity items, light transmittance of each pixel is inevitably fixed in hardware, so that the controllable item acquisition unit 320 may not consider the light transmittance item as a controllable item.

In response to luminance of the target region received from the luminance acquisition unit 310 and the controllable item received from the controllable item acquisition unit 320, the set value calculation unit 330 may calculate the set value for each controllable item, and may generate a control signal (CS) indicating the calculated set value (S30).

The set value calculation unit 330 may calculate the set value for each controllable item such that each of the pixels of the image sensing device 100 has an optimal dynamic range. Here, the optimal dynamic range may refer to a dynamic range that can minimize noise while being as wide as possible.

In order to maximize the dynamic range, the amount of photocharges generated by the photoelectric conversion element (PD) should be increased to a maximum amount of photocharges unless saturated in the photoelectric conversion element (PD), and image data should be created with a maximum gain (e.g., a conversion gain and an analog gain) unless saturated in the ADC 140.

In this case, the saturation within the photoelectric conversion element (PD) may represent that the amount of photocharges has increased to exceed a full well capacity (FWC) indicating the amount of photocharges that can be maximally generated and accumulated by the photoelectric conversion element (PD). In addition, the saturation within the ADC 140 may represent that image data corresponding to the upper limit of the output range of the ADC 140 was generated.

The method for increasing the amount of photocharges generated by the photoelectric conversion element (PD) may be implemented as a method of increasing the degree of opening of the aperture 20 by the aperture driver 40 so that the amount of light exposure can increase, or may be implemented as a method of allowing the row driver 120 to increase a time period in which the transfer signal has a logic high level so that the exposure time can increase.

The method for increasing a gain required to generate image data may be implemented as a method for turning on the CG transistor by the row driver 120 so that the conversion gain can increase, or may be implemented as a method for reducing the slope of a ramp signal by the timing controller 170 so that the analog gain can increase.

The set value calculation unit 330 may determine whether each pixel included in the target region has been saturated based on the image data of the target region received from the luminance acquisition unit 310. The saturation of each pixel may conceptually include saturation in the photoelectric conversion element (PD) and saturation in the ADC 140. In some implementations, it is assumed that, when image data of each pixel corresponds to the upper limit of the output range of the ADC 140, this means that the corresponding pixel has been saturated.

In addition, the set value calculation unit 330 may determine whether each pixel can be saturated through control of controllable items. To this end, the set value calculation unit 330 may prestore response characteristics indicating that the response of the corresponding pixel is changed in response to controlling each of the controllable items (e.g., light transmittance, exposure time, conversion gain, and analog gain) to a specific set value. Such response characteristics can be experimentally determined by measuring the response of each pixel while changing the set value of each controllable item. For example, based on current image data of the high light-transmittance pixel of the target region and response characteristics of the high light-transmittance pixel of the target region, the set value calculation unit 330 can determine whether the high light-transmittance pixel can be saturated in a situation where the set value for each controllable item (e.g., light transmittance, exposure time, conversion gain, and/or analog gain) is controlled to maximize the sensitivity of the high light-transmittance pixel. If the high light-transmittance pixel cannot be saturated, this means that current luminance is very low. As a result, although the exposure time is very short like the short-exposure pixel, it is impossible to obtain the effect of extension of the dynamic range, thereby deteriorating the signal-to-noise ratio (SNR). Therefore, the set value calculation unit 330 may exclude the exposure time from the controllable items, and may forcibly set the exposure time to the longest exposure time.

In another embodiment of the disclosed technology, when either an average value (i.e., average luminance) or a maximum value (i.e., maximum luminance) of current image data of the high light-transmittance pixel (HPX) is lower than a predetermined value (e.g., for use in a night photographing mode or a moving-image photographing mode, etc.), the set value calculation unit 330 may determine the presence of the environment having a very low luminance, may exclude the exposure time from the controllable items, and may set the exposure time to the longest time serving as the only one value.

The method for adjusting the sensitivity of each pixel by controlling light transmittance may spatially adjust the amount of light incident upon the pixel so that the low light-transmittance pixel (LPX) is not saturated even at a high luminance where the high light-transmittance pixel (HPX) is saturated, resulting in occurrence of a valid response. As a result, the above-described method for adjusting the sensitivity of each pixel by controlling light transmittance can significantly extend the dynamic range of each pixel by increasing the substantial full well capacity (FWC). However, the light transmittance may be fixed in advance in the process of manufacturing the image sensing device 100, and the light transmittance cannot be dynamically controlled so that the light transmittance may be considered to be an uncontrollable item.

The method for adjusting the sensitivity of each pixel by controlling the exposure time may temporally adjust the amount of light incident upon the pixel, so that the low-exposure pixel is not saturated even at a high luminance where the long-exposure pixel is saturated, resulting in occurrence of a valid response. As a result, the above-described method for adjusting the sensitivity of each pixel by controlling the exposure time can significantly extend the dynamic range of each pixel by increasing the substantial full well capacity (FWC). However, when the exposure time is excessively adjusted, a time point where light incident upon each of the pixels is captured is greatly changed. As a result, motion artifacts for the fast moving object to be captured increase, resulting in reduction in image quality.

The method for adjusting the sensitivity of each pixel by controlling the conversion gain may control the conversion gain by which photocharges generated by the pixel are converted into a pixel signal (i.e., voltage), and may obtain the amplified voltage in response to a constant gain even at a low luminance where the amount of generated photocharges is considered insufficient, thereby preventing occurrence of noise. However, since a valid response cannot be obtained even when the conversion gain is controlled for the pixel in which the photoelectric conversion element (PD) is saturated, there is a limitation in extending the dynamic range of the pixel.

The method for adjusting the sensitivity of each pixel by controlling the analog gain may control the gain by which the pixel signal is converted into image data (e.g., a digital value), and may obtain the amplified image data in response to a constant gain even at a low luminance where the amount of generated photocharges is considered insufficient, thereby preventing occurrence of noise. However, since a valid response cannot be obtained even when the analog gain is controlled for the pixel in which the photoelectric conversion element (PD) is saturated, there is a limitation in extending the dynamic range of the pixel. In addition, when the analog gain increases, the input range corresponding to a voltage range of the pixel signal that can be effectively converted into image data by the ADC 140 is unavoidably reduced as illustrated in FIG. 8, so that there may occur side effects in which the dynamic range is rather reduced depending on luminance.

The imaging device 1 can extend the dynamic range of the image data based on characteristics of the controllable items that can be used to adjust the sensitivity of each pixel. In an embodiment, the imaging device 1 may sequentially adjust the sensitivity of each pixel in the order of the light transmittance, sensitivity control using the conversion gain, sensitivity control using the exposure time, and sensitivity control using the analog gain, so that the imaging device 1 can extend the dynamic range through such sensitivity control. The order or priority of sensitivity control discussed above may be determined based on the dynamic range extension and the side effects. In another embodiment, the above-mentioned sensitivity control priority may also be changed as needed. In addition, the imaging device 1 may calculate the set value for each controllable item so that the intensity of light incident upon each pixel can be maximized when controlling the sensitivity of each pixel.

In some implementations, the set value for each controllable item can be calculated by the set value calculation unit 330 as will be discussed below with reference to FIG. 10. For convenience of description, it is assumed that the conversion gain and the analog gain can always be controlled and each of the amount of light exposure and the exposure time is controllable or uncontrollable. That is, the controllable item acquisition unit 320 may acquire any controllable item from among the amount of light exposure and the exposure time.

It is also assumed that the arrangement and structure of the low light-transmittance pixel and the high light-transmittance pixel are the same as what is shown in FIG. 5. That is, it is assumed that a single unit matrix includes one low light-transmittance pixel and three high light-transmittance pixels for convenience of description and better understanding of the disclosed technology.

The set value calculation unit 330 may determine whether the amount of light exposure is a controllable item (S300).

If the amount of light exposure is an uncontrollable item (No, S300), the set value calculation unit 330 may determine whether the exposure time is a controllable item (Yes, S310).

If the exposure time is a controllable item (Yes, S310), the set value calculation unit 330 may perform first setting control (S320). Here, the first setting control (S320) may refer to a method for controlling the controllable items in a situation where the amount of light exposure is an uncontrollable item and each of the exposure time, the conversion gain, and the analog gain is a controllable item.

Specifically, the set value calculation unit 330 may determine whether a requested dynamic range can be obtained from the target region by controlling a conversion gain of the high light-transmittance pixel and a conversion gain of the low light-transmittance pixel. In this case, the requested dynamic range may refer to a dynamic range suitable for photographing the target region.

In some implementations, when the ratio of high light-transmittance pixels, each of which has a response of a predetermined value or less in the target region through control of the conversion gain for each of the high light-transmittance pixel and the low light-transmittance pixel, is less than a first ratio, and when the ratio of low light-transmittance pixels, each of which is saturated in the target region, is equal to or less than a second ratio, the set value calculation unit 330 may determine that the requested dynamic range can be obtained from the target region. Conversely, regardless of control of the conversion gain for each of the high light-transmittance pixel and the low light-transmittance pixel, when the ratio of high light-transmittance pixels, each of which has a response of a predetermined value or less in the target region, is equal to or higher than the first ratio, and when the ratio of low light-transmittance pixels, each of which is saturated in the target region, is higher than a second ratio, the set value calculation unit 330 may determine that the requested dynamic range cannot be obtained from the target region. Here, the first ratio may refer to the ratio of the number of high light-transmittance pixels each having a predetermined value or less to the total number of high light-transmittance pixels within the target region. The second ratio may refer to the ratio of the number of low light-transmittance pixels, each of which is saturated in the target region, to the total number of low light-transmittance pixels in the target region. The first ratio and the second ratio may be experimentally determined in advance in response to the requested dynamic range. For example, the predetermined value may refer to a lower limit of the dynamic range (DR_H) of the high-sensitivity pixel described in FIG. 2. In addition, a first condition is that the ratio of high light-transmittance pixels each having a predetermined value in the target region is less than the first ratio, and a second condition is that the ratio of low light-transmittance pixels each of which is saturated in the target region is equal to or less than the second ratio.

In another embodiment, the set value calculation unit 330 may receive information about whether the requested dynamic range can be obtained from another structure (e.g., a structure for synthesizing the HDR image) of the image signal processor 200.

In the first setting control, if it is assumed that the requested dynamic range can be obtained from the target region through control of the conversion gain for each of the high light-transmittance pixel and the low light-transmittance pixel, the set value calculation unit 330 may set or determine the longest exposure time and the optimal analog gain for each of the high light-transmittance pixel and the low light-transmittance pixel. Here, when the ratio of high light-transmittance pixels each having a predetermined value in the target region is less than the first ratio, and when the ratio of low light-transmittance pixels, each of which is saturated in the target region, is equal to or less than the second ratio, the longest exposure time may be set to a maximum exposure time. In addition, the lowest analog gain may be a minimum analog gain that can be set or determined by the ADC 140. As the analog gain decreases, the input range of the ADC 140 can increase, so that the dynamic range can be prevented from being unexpectedly restricted.

If the requested dynamic range cannot be obtained from the target region through control of the conversion gain for each of the high light-transmittance pixel and the low light-transmittance pixel, the set value calculation unit 330 can extend the dynamic range by controlling the exposure time. As can be seen from FIG. 6, the length of the first exposure period (EX1) of the long-exposure pixel will hereinafter be referred to as a first exposure time, and the length of the second exposure period (EX2) of the short-exposure pixel will hereinafter be referred to as a second exposure time.

The set value calculation unit 330 may determine a first exposure time such that the ratio of high light-transmittance pixels each having a predetermined value or less in the target region is less than the first ratio. In addition, the set value calculation unit 330 may determine a second exposure time such that the ratio of low light-transmittance pixels each of which is saturated in the target region is equal to or less than the second ratio. However, a time difference between the first exposure time and the second exposure time may be minimized to reduce motion artifacts. In order to maximize the dynamic range by maximizing a difference in sensitivity between the low light-transmittance pixel and the high light-transmittance pixel using the first exposure time and the second exposure time having a minimum difference therebetween, the second exposure time may be configured in the low light-transmittance pixel and the first exposure time may be configured in the high light-transmittance pixel.

As can be seen from FIG. 7, the conversion gain of the high CG pixel will hereinafter be referred to as a first conversion gain, and the conversion gain of the low CG pixel will hereinafter be referred to as a second conversion gain. Further, as depicted in FIG. 8, the analog gain of the high AG pixel will hereinafter be referred to as a first analog gain, and the analog gain of the low AG pixel will hereinafter be referred to as a second analog gain. For convenience of description, it is assumed that the second analog gain is equal to the lowest analog gain described above.

The set value calculation unit 330 may set or determine a second conversion gain, a second exposure time, and a second analog gain for the low light-transmittance pixel. In this case, the reason why the second conversion gain and the second exposure time are configured for the low light-transmittance pixel is to extend the dynamic range of each low light-transmittance pixel. The reason why the second analog gain is configured for the low light-transmittance pixel is to prevent restriction of the dynamic range.

For the high light-transmittance pixels, the set value calculation unit 330 may set a plurality of conversion gains including the first conversion gain, a plurality of exposure times including the first exposure time, and a second analog gain. That is, the plurality of conversion gains may include the first conversion gain, and the plurality of exposure times may include the first exposure time, so that the dynamic range of the high light-transmittance pixel can be extended, and the reason why the second analog gain is configured for the high light-transmittance pixel is to prevent restriction of the dynamic range. In addition, the plurality of conversion gains and the plurality of exposure times for the high light-transmittance pixels are combined with each other and the result of combination is set or configured for the high light-transmittance pixels, so that the high light-transmittance pixels may have various dynamic ranges. When the high light-transmittance pixels having various dynamic ranges are synthesized as described above, only image data having excellent SNR is synthesized to generate the HDR image, resulting in improvement of the image quality. As an example of the unit matrix, the set value calculation unit 330 may set the first conversion gain and the first exposure time for only one high light-transmittance pixel, may set the second conversion gain and the second exposure time for another high light-transmittance pixel, and may set the second conversion gain and the first exposure time for the remaining high light-transmittance pixels other than the above two high light-transmittance pixels.

If the exposure time is an uncontrollable item (No, S310), the set value calculation unit 330 may determine whether the ratio of the low light-transmittance pixels saturated in the target region exceeds the second ratio (S330).

If the ratio of the low light-transmittance pixels saturated in the target region exceeds the second ratio (Yes, S330), the set value calculation unit 330 may perform second setting control (S340). In this case, the second setting control may refer to a method for controlling the controllable items, under the condition that the amount of light exposure and the exposure time are uncontrollable items, the conversion gain and the analog gain are controllable items, and the ratio of low light-transmittance pixels saturated in the target region exceeds the second ratio. The above-described condition may refer to a relatively high luminance condition in which even the low light-transmittance pixels corresponding to a predetermined ratio or higher are saturated.

The set value calculation unit 330 may set a first conversion gain or a second conversion gain in a predetermined pattern for the low light-transmittance pixel and the high light-transmittance pixel. The set value calculation unit 330 may set or configure a first analog gain for each pixel having the first conversion gain. The set value calculation unit 330 may set or configure a second analog gain for each pixel having the second conversion gain. As a result, as large a sensitivity difference as possible can be implemented using the conversion gain and the analog gain. However, when the pixel having the first conversion gain is set to have the first analog gain, there is a possibility that the dynamic range is rather limited. In another embodiment, the set value calculation unit 330 may set a second analog gain for the pixel having the first conversion gain, or may selectively set the first analog gain or the second analog gain for the pixel having the first conversion gain as needed.

If the ratio of low light-transmittance pixels saturated in the target region is equal to or less than the second ratio (No, S330), the set value calculation unit 330 may determine whether the ratio of high light-transmittance pixels, each of which has a response less than a predetermined value in the target region, is less than the first ratio (S350).

If the ratio of the high light-transmittance pixels, each of which has a response of a predetermined value or less in the target region is less than the first ratio (Yes, S350), the set value calculation unit 330 may perform third setting control (S360). In this case, the third setting control may refer to a method for controlling the controllable items, under the condition that the amount of light exposure and the exposure time are uncontrollable items, the conversion gain and the analog gain are controllable items, the ratio of low light-transmittance pixels saturated in the target region is equal to or less than the second ratio, and the ratio of high light-transmittance pixels each having a predetermined value or less in the target region is less than the first ratio. The above-described condition may refer to an appropriate luminance condition in which the ratio of low light-transmittance pixels saturated in the target region is equal to or less than the second ratio and the ratio of high light-transmittance pixels each having a response of a predetermined value or less is less than the first ratio.

When the first conversion gain is set for the low light-transmittance pixel, the set value calculation unit 330 may determine whether the ratio of low light-transmittance pixels saturated in the target region can be kept at the second ratio or less. If the saturated low light-transmittance pixel can be kept at the second ratio or less, the set value calculation unit 330 may set the first conversion gain for the low light-transmittance pixel. If the ratio of the saturated low light-transmittance pixel exceeds the second ratio, the set value calculation unit 330 may set the second conversion gain for the low light-transmittance pixel.

On the other hand, the set value calculation unit 330 may set the first conversion gain or the second conversion gain in a predetermined pattern for the high light-transmittance pixels. In this case, the predetermined pattern may set the same conversion gain as the low light-transmittance pixel for the high light-transmittance pixels belonging to the same row as the low light-transmittance pixels, and may set another conversion gain different from that of the low light-transmittance pixel for the high light-transmittance pixels belonging to another row different from that of the low light-transmittance pixels, but is not limited thereto.

Under the condition that the conversion gain is set for each low light-transmittance pixel and the conversion gain is set for each high light-transmittance pixel as described above, the set value calculation unit 330 may set a maximum analog gain for each of the low light-transmittance pixel and the high light-transmittance pixel within the range in which the ratio of low light-transmittance pixels saturated in the target region is equal to or less than the second ratio and the ratio of high light-transmittance pixels each having a response of a predetermined value or less is less than the first ratio. As a result, as large a dynamic range as possible can be obtained and occurrence of noise can also be prevented.

If the ratio of high light-transmittance pixels each having a response of a predetermined value or less in the target region is equal to or higher than the first ratio (No, S350), the set value calculation unit 330 can perform fourth setting control (S370). In this case, the fourth setting control may refer to a method for controlling the controllable items, under the condition that the amount of light exposure and the exposure time are uncontrollable items, the conversion gain and the analog gain are controllable items, the ratio of low light-transmittance pixels saturated in the target region is equal to or less than the second ratio, and the ratio of high light-transmittance pixels each having a predetermined value or less in the target region is equal to or higher than the first ratio. The above-described condition may refer to a relatively low luminance condition in which the ratio of high light-transmittance pixels each having a response of a predetermined value or less is equal to or higher than the first ratio.

The set value calculation unit 330 may set the first conversion gain for the low light-transmittance pixel.

On the other hand, the set value calculation unit 330 may set the first conversion gain or the second conversion gain in a predetermined pattern for the high light-transmittance pixels. In this case, when each of the high light-transmittance pixels is set to the first conversion gain and the ratio of high light-transmittance pixels each having a response of a predetermined value or less is equal to or higher than the first ratio, the set value calculation unit 330 may set the first conversion gain rather than a predetermined pattern for the high light-transmittance pixels. This is because extension of the dynamic range cannot be expected regardless of the second conversion gain that is set for the high light-transmittance pixels.

In a state in which the conversion gain is set for the low light-transmittance pixels and the conversion gain is set the high light-transmittance pixels as described above, the set value calculation unit 330 may set as high an analog gain as possible for the low light-transmittance pixels and the high light-transmittance pixels while being kept in a specific condition where the ratio of low light-transmittance pixels saturated in the target region is equal to or less than the second ratio. As a result, as large a dynamic range as possible can be obtained and occurrence of noise can also be prevented.

If the amount of light exposure is a controllable item (Yes, S300), the set value calculation unit 330 may set the amount of light exposure such that the aperture 20 can be maximally opened within the range in which the ratio of low light-transmittance pixels saturated in the target region is equal to or less than the second ratio (S380).

In a state where the amount of light exposure is fixed to a specific set value, the set value calculation unit 330 may determine whether the exposure time is a controllable item (S390).

If the exposure time is a controllable item (Yes, S390), the set value calculation unit 330 can perform first setting control (S320). The reason why the first setting control is performed is that, in a condition where the amount of light exposure is fixed and uncontrollable, the exposure time is considered to be a controllable item.

If the exposure time is an uncontrollable item (No, S390), the set value calculation unit 330 can perform third setting control (S360). The reason why the third setting control is performed is as follows. In a state where the amount of light exposure is fixed and uncontrollable and the exposure time is a controllable item, the aperture 20 may be set to be maximally opened within the range in which the ratio of low light-transmittance pixels saturated in the target region is equal to or less than the second ratio, so that there is a high possibility that the ratio of high light-transmittance pixels each having a response of a predetermined value or less in the target region is less than the first ratio. As a result, the set value calculation unit 330 can perform the third setting control (S360).

Referring back to FIG. 9, the set value calculation unit 330 may transmit the control signal (CS) indicating a set value for each controllable item to the aperture driver 40 and the image sensing device 100. The aperture driver 40 may control the degree of opening of the aperture 20 in a manner that the aperture driver 40 has the amount of light exposure corresponding to the control signal (CS). In addition, the timing controller 170 of the image sensing device 100 may control the row driver 120 and the ADC 140 in a manner that each pixel has exposure time, conversion gain, and analog gain corresponding to the control signal (CS).

In a state where control of the control signal (CS) is completed, the image sensing device 100 may capture an image of a scene to form image data (IDATA), and may transmit the image data (IDATA) to the image signal processor 200. The image signal processor 200 may synthesize at least two images having different sensitivities, and may thus form the HDR image using the result of image synthesis (S40). The types of sensitivity of image data (IDATA) may be determined in various ways by combination of light transmittance, exposure time, conversion gain, and analog gain. For example, the pixels included in the pixel array 110 may have any one of five sensitivities, and each of two pixels having different sensitivities may correspond to the low-sensitivity pixel or the high-sensitivity pixel according to the magnitude relationship in sensitivity between the two pixels.

The imaging device 1 implemented based on some embodiments of the disclosed technology may determine the luminance of the subject to be captured and one or more controllable items to control the controllable items by reflecting hardware characteristics (e.g., response characteristics) when controlling the sensitivity, thereby generating the HDR image having a maximum dynamic range while minimizing noise.

In various implementations, the imaging device based on some implementations of the disclosed technology can determine a luminance and controllable items of a target object to be captured (or photographed) and control the controllable items by reflecting hardware characteristics (e.g., response characteristics) into a process of controlling the sensitivity of the imaging device, generating a high dynamic range (HDR) image having a maximum dynamic range while minimizing noise.

Although a number of illustrative embodiments have been described, it should be understood that modifications and enhancements to the disclosed embodiments and other embodiments can be devised based on what is described and/or illustrated in this patent document.

What is claimed is:

1. An imaging device comprising:
an image sensing device including a plurality of pixels, each of which is structured to detect incident light from a scene to generate a pixel signal corresponding to an intensity of the incident light and generate image data corresponding to the pixel signal, wherein the image sensing device operates to perform imaging operation in response to a control signal;
an aperture driver configured to adjust a degree of opening or closing of an aperture disposed in front of the image sensing device;
a luminance acquisition unit configured to acquire the image data corresponding to first pixels among the plurality of pixels associated with a target region of an image of the scene captured by the image sensing device;
a controllable item acquisition unit configured to acquire one or more sensitivity items indicative of sensitivity of each pixel to light, as a controllable item; and
a set value calculation unit configured to generate the control signal to the image sensing device by calculating a set value for the controllable item based on the image data of the target region and the controllable item,
wherein:
the one or more sensitivity items include at least one of an amount of light exposure, light transmittance, an exposure time, a conversion gain, and an analog gain; and
the amount of light exposure is controlled by adjusting the degree of opening or closing of the aperture.

2. The imaging device according to claim 1, further comprising:
an image synthesis unit configured to: synthesize image data having different sensitivities generated by adjusting the sensitivity of each of the plurality of pixels in response to the control signal; and generate a high dynamic range (HDR) image of the scene captured by the image sensing device.

3. The imaging device according to claim 1, further comprising:
a row driver configured to generate a transfer signal for transmitting photocharges generated in each of the plurality of pixels in response to the intensity of incident light to a floating diffusion region,
wherein the exposure time is controlled by adjusting a time period during which the transfer signal has a predetermined level.

4. The imaging device according to claim 1, further comprising:
a row driver configured to generate a conversion gain signal for controlling capacitance of a floating diffusion region in which photocharges are accumulated, wherein the conversion gain is controlled by adjusting a voltage level of the conversion gain signal.

5. The imaging device according to claim 1, further comprising:
an analog-to-digital converter configured to generate the image data in response to comparing the pixel signal for each of the plurality of pixels with a ramp signal,
wherein the analog gain is controlled by adjusting a slope of the ramp signal.

6. The imaging device according to claim 1, wherein:
the set value calculation unit calculates the set value so that the sensitivity of each of the pixels is adjusted in an order of the light transmittance, the conversion gain, the exposure time, and the analog gain.

7. An imaging device comprising:
an image sensing device including a plurality of pixels structured to detect incident light to generate a pixel signal corresponding to an intensity of the incident light and generate image data corresponding to the pixel signal;
an aperture driver configured to adjust a degree of opening or closing of an aperture disposed in front of the image sensing device;
a high dynamic range (HDR) controller configured to generate a control signal by calculating a set value for at least one of an amount of light exposure, an exposure time, a conversion gain, and an analog gain, as a controllable item, based on the image data;
an image signal processor coupled to receive the control signal from the high dynamic range (HDR) controller and configured to synthesize image data having different sensitivities generated by adjusting the sensitivity of each of the plurality of pixels in response to the received control signal and generate a high dynamic range (HDR) image based on the image data,
wherein the amount of light exposure is controlled by adjusting the degree of opening or closing of the aperture; and
a row driver configured to generate a transfer signal for transmitting photocharges generated in each of the plurality of pixels in response to the intensity of incident light to a floating diffusion region,
wherein the exposure time is controlled by adjusting a time period during which the transfer signal has a predetermined level.

8. An imaging device comprising:
an image sensing device including a plurality of pixels, each of which is structured to detect incident light from a scene to generate a pixel signal corresponding to an intensity of the incident light and generate image data corresponding to the pixel signal, wherein the image sensing device operates to perform imaging operation in response to a control signal;
a luminance acquisition unit configured to acquire the image data corresponding to first pixels among the plurality of pixels associated with a target region of an image of the scene captured by the image sensing device;
a controllable item acquisition unit configured to acquire one or more sensitivity items indicative of sensitivity of each pixel to light, as a controllable item; and
a set value calculation unit configured to generate the control signal to the image sensing device by calculating a set value for the controllable item based on the image data of the target region and the controllable item, wherein:

the plurality of pixels includes at least one high light-transmittance pixel and at least one low light-transmittance pixel, wherein the high light-transmittance pixel has a higher light-transmittance than the low light-transmittance pixel;
the low light-transmittance pixel includes a light blocking structure for blocking at least part of the incident light; and
a high dynamic range (HDR) image is generated by synthesizing image data generated from the high light-transmittance pixel and image data generated from the low light-transmittance pixel.

9. The imaging device according to claim 8, wherein:
the set value calculation unit is configured to determine whether each of the first pixels is saturated by controlling the controllable item.

10. The imaging device according to claim 9, wherein:
when the high light-transmittance pixels included in the first pixels are not saturated, the set value calculation unit sets an exposure time to a fixed value.

11. The imaging device according to claim 8, wherein:
when an average value of image data of the high light-transmittance pixels included in the first pixels is less than a predetermined value, the set value calculation unit sets an exposure time to a fixed value.

12. The imaging device according to claim 8, wherein the controllable item includes an exposure time, a conversion gain, and an analog gain, and an amount of light exposure is an uncontrollable item,
wherein the set value calculation unit sets a plurality of conversion gains including a first conversion gain for the high light-transmittance pixels, sets a plurality of exposure times including a first exposure time for the high light-transmittance pixels, and sets a second analog gain for the high light-transmittance pixels, and
wherein the set value calculation unit sets a second conversion gain, a second exposure time, and a second analog gain for the low light-transmittance pixels,
wherein:
the first conversion gain is greater than the second conversion gain;
the first exposure time is longer than the second exposure time; and
the second analog gain is less than a first analog gain.

13. The imaging device according to claim 12, wherein the set value calculation unit is configured to:
determine the first exposure time such that a ratio of the high light-transmittance pixels each having a response of a predetermined value or less in the target region is less than a first ratio; and
determine the second exposure time such that a ratio of the low light-transmittance pixels saturated in the target region is less than or equal to a second ratio.

14. The imaging device according to claim 13, wherein:
in a situation where the at least one controllable item includes the conversion gain and the analog gain, and the amount of light exposure and the exposure time are uncontrollable items, when the ratio of the low light-transmittance pixels saturated in the target region is higher than the second ratio,
the set value calculation unit sets the first conversion gain or the second conversion gain in a predetermined pattern for the low light-transmittance pixels and the high light-transmittance pixels,
wherein the set value calculation unit sets the first analog gain for a pixel that is set to the first conversion gain, and sets the second analog gain for a pixel that is set to the second conversion gain.

15. The imaging device according to claim 13, wherein:
in a situation where the at least one controllable item includes the conversion gain and the analog gain, and the amount of light exposure and the exposure time are uncontrollable items, when the ratio of the low light-transmittance pixels saturated in the target region is equal to or less than the second ratio, and the ratio of the high light-transmittance pixels each having a response of a predetermined value or less in the target region is less than the first ratio, the set value calculation unit determines whether the ratio of the low light-transmittance pixels saturated in the target region is maintained at the second ratio or less in a state where the first conversion gain is set for the low light-transmittance pixels, sets the first conversion gain or the second conversion gain for the low light-transmittance pixels according to the result of determination, and sets the first conversion gain or the second conversion gain in a predetermined pattern for the high light-transmittance pixels; and the set value calculation unit sets a maximum analog gain for the low light-transmittance pixels and the high light-transmittance pixels within a predetermined range in which conditions indicating that the ratio of the low light-transmittance pixels saturated in the target region is equal to or less than the second ratio and the ratio of the high light-transmittance pixels each having a response of the predetermined value or less in the target region is less than the first ratio are maintained.

16. The imaging device according to claim 13, wherein:
in a situation where the at least one controllable item includes the conversion gain and the analog gain, and the amount of light exposure and the exposure time are uncontrollable items, when the ratio of the low light-transmittance pixels saturated in the target region is equal to or less than the second ratio, and the ratio of the high light-transmittance pixels each having a response of a predetermined value or less in the target region is equal to or higher than the first ratio, the set value calculation unit sets the first conversion gain for the low light-transmittance pixels, and sets the first conversion gain or the second conversion gain in a predetermined pattern for the high light-transmittance pixels; and the set value calculation unit sets a maximum analog gain for the low light-transmittance pixels and the high light-transmittance pixels within a predetermined range in which conditions indicating that the ratio of the low light-transmittance pixels saturated in the target region is equal to or less than the second ratio are maintained.

17. The imaging device according to claim 13, wherein the controllable item includes the amount of light exposure, wherein the set value calculation unit sets the amount of light exposure such that an aperture is maximally opened within a predetermined range in which the ratio of low light-transmittance pixels saturated in the target region is equal to or less than the second ratio.

* * * * *